United States Patent [19]

Messner

[11] Patent Number: 5,431,749
[45] Date of Patent: Jul. 11, 1995

[54] TAPE LAYING HEAD WITH CURVED TAPE LAYING CAPABILITY AND IMPROVED ADAPTIVE STEERING

[75] Inventor: Bernd A. K. Messner, Rockford, Ill.

[73] Assignee: The Ingersoll Milling Machine Company, Rockford, Ill.

[21] Appl. No.: 129,738

[22] Filed: Sep. 30, 1993

[51] Int. Cl.⁶ .................. B32B 31/00; G05G 15/00
[52] U.S. Cl. ........................ 156/358; 156/361; 156/523; 156/574; 156/577
[58] Field of Search .............. 156/350, 358, 361, 523, 156/527, 574, 577

[56] References Cited

U.S. PATENT DOCUMENTS

| | | | |
|---|---|---|---|
| 4,382,836 | 5/1983 | Frank | 156/574 X |
| 4,627,886 | 12/1986 | Grone et al. | 156/361 |
| 4,696,707 | 9/1987 | Lewis et al. | 156/361 X |
| 4,750,965 | 6/1988 | Pippel et al. | 156/361 |
| 5,041,179 | 8/1991 | Shinno et al. | 156/361 X |
| 5,269,869 | 12/1993 | Peterson | 156/361 |

FOREIGN PATENT DOCUMENTS 2528871 1/1984 France .................. 156/361

*Primary Examiner*—David A. Simmons
*Assistant Examiner*—Paul M. Rivard
*Attorney, Agent, or Firm*—Fitch, Even, Tabin & Flannery

[57] ABSTRACT

The tape laying head disclosed mounts the laydown rollers for steerability as a unit independently of the steering of the tape head as a whole. The separate steerability of the laydown roller unit is utilized for adaptive steering control in response to edgewise drift of the tape during normal tape laying, as determined by tape edge sensors. When laying tape along a curved path other than the natural path of the tape in free-rolling movement, the laydown roller unit is steered in counterrotation to the steering of the tape head as a whole, thereby to cause a relative axial shift of increments of the tape across its width, enabling the tape to lie flat along a curved course on the lay surface.

10 Claims, 15 Drawing Sheets

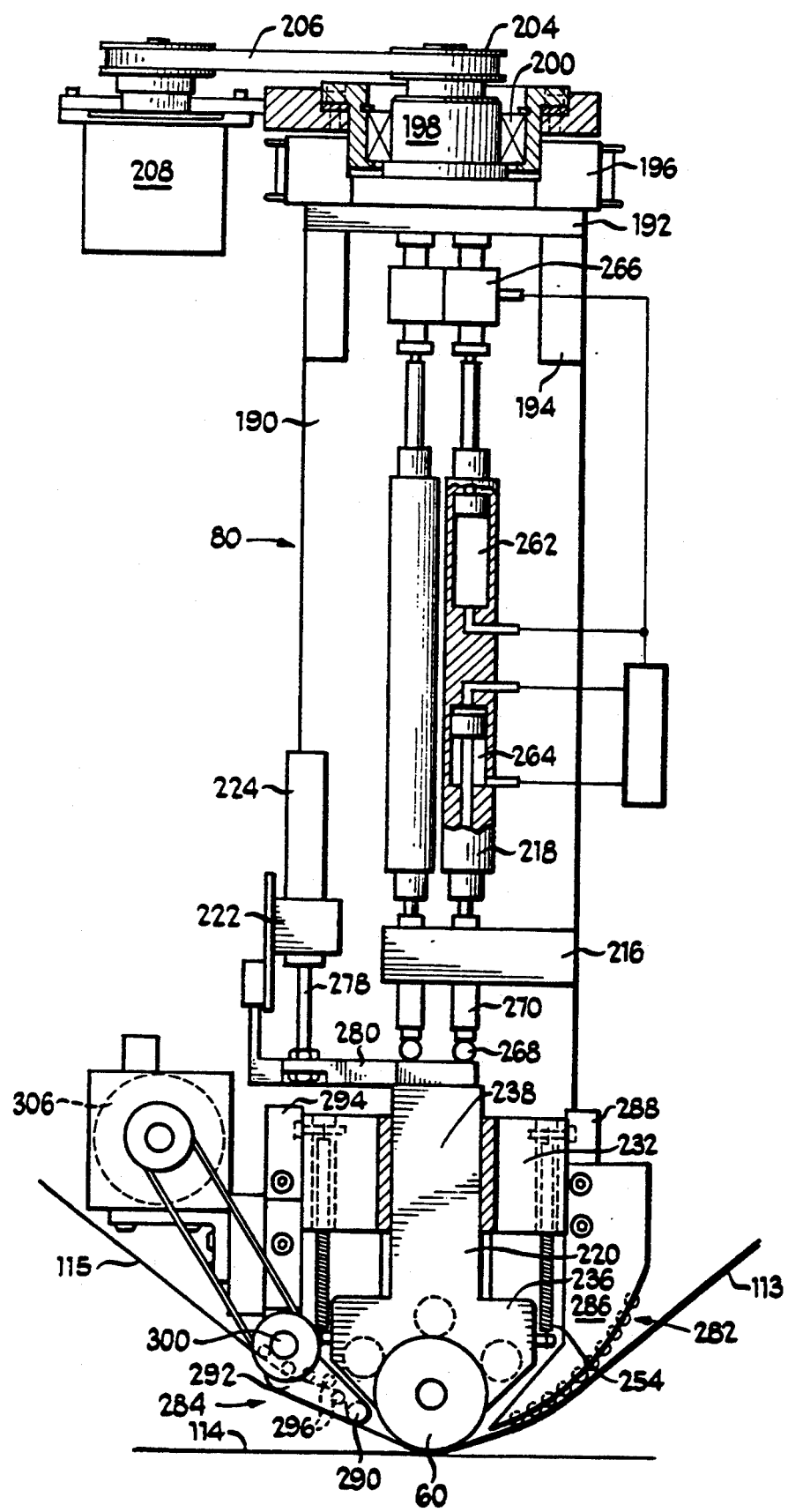

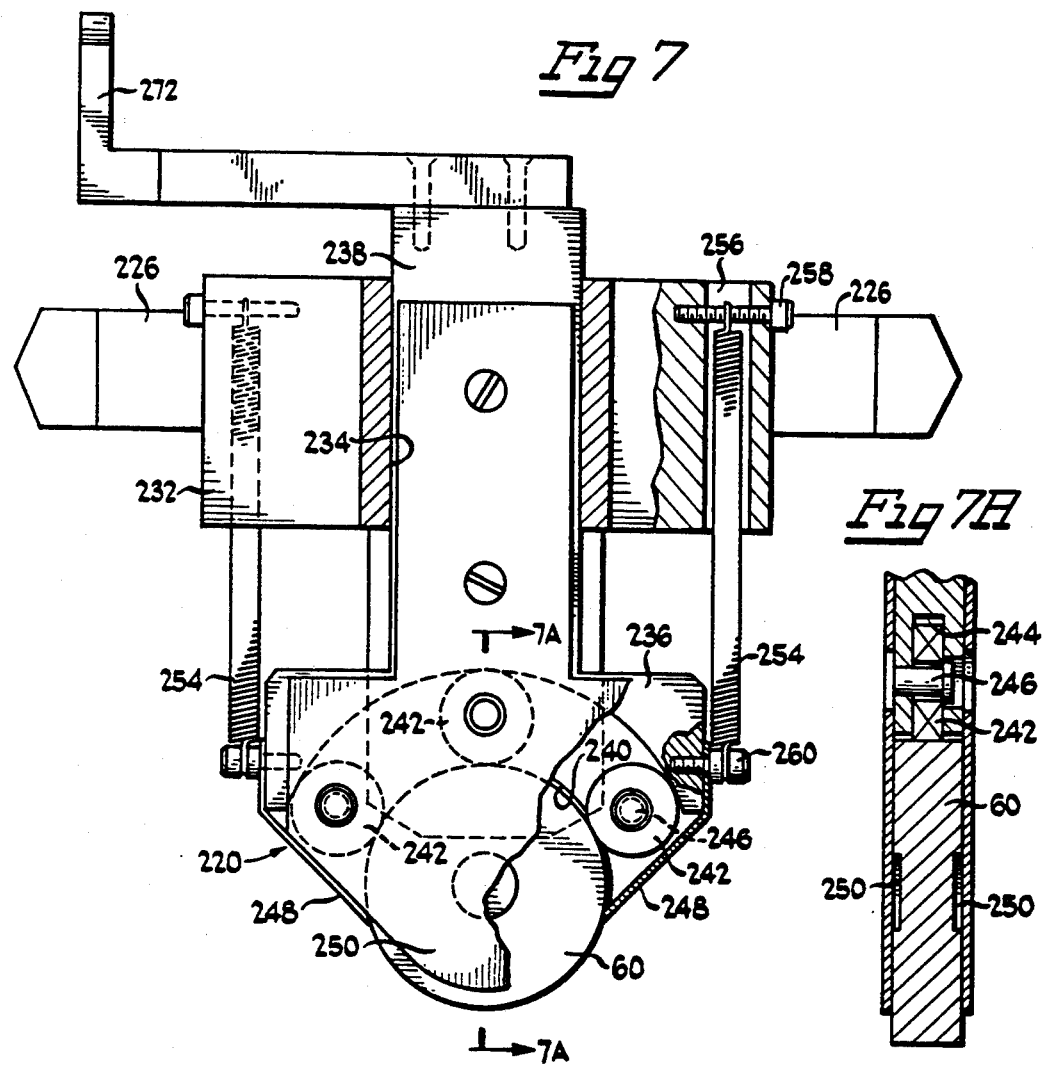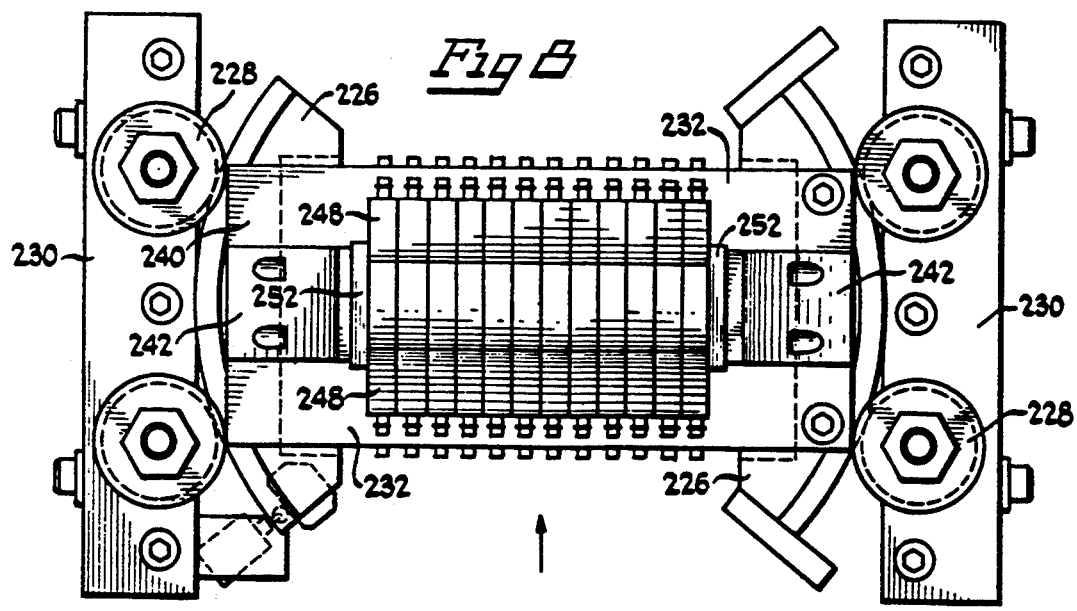

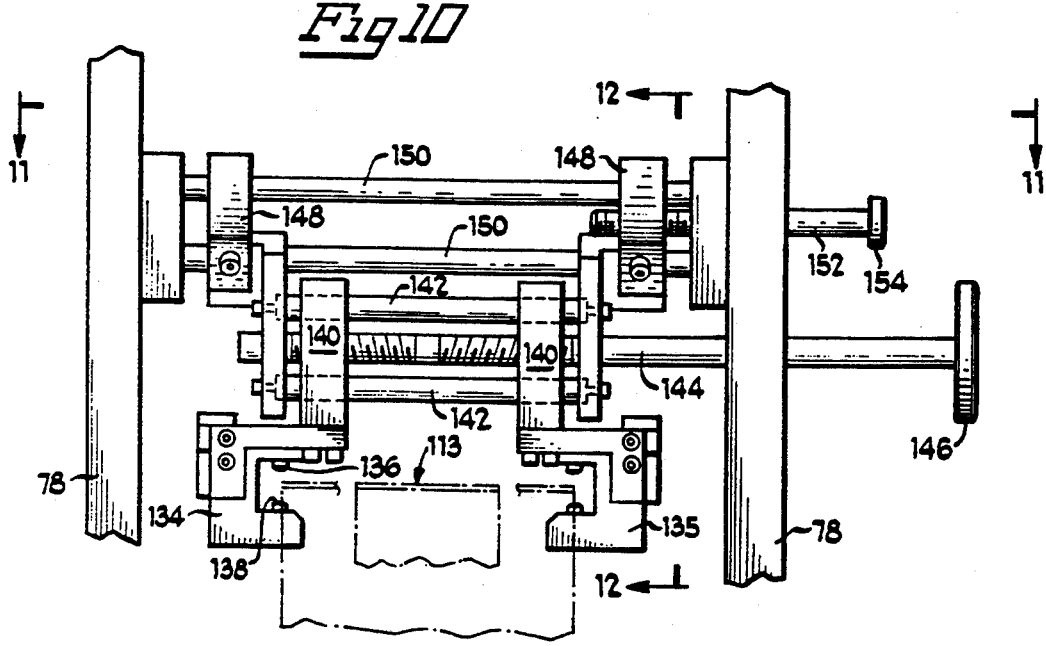
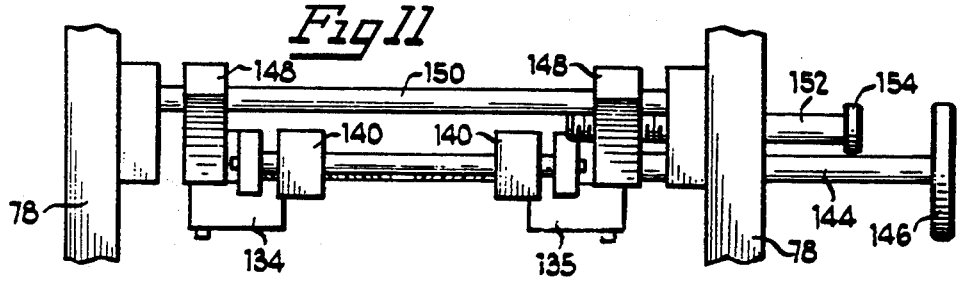
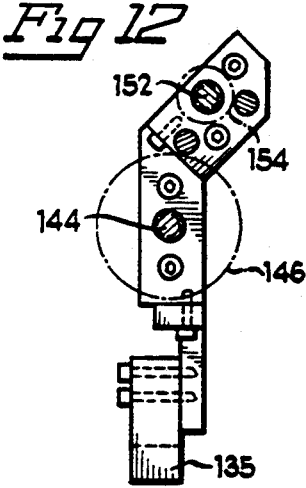
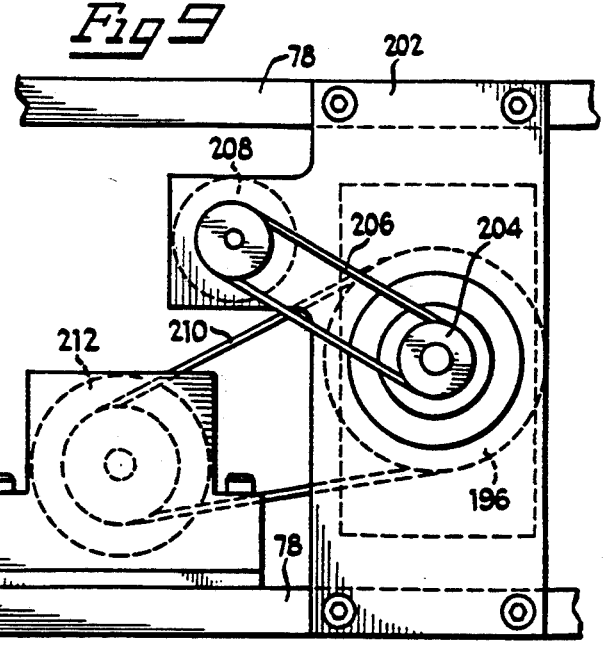

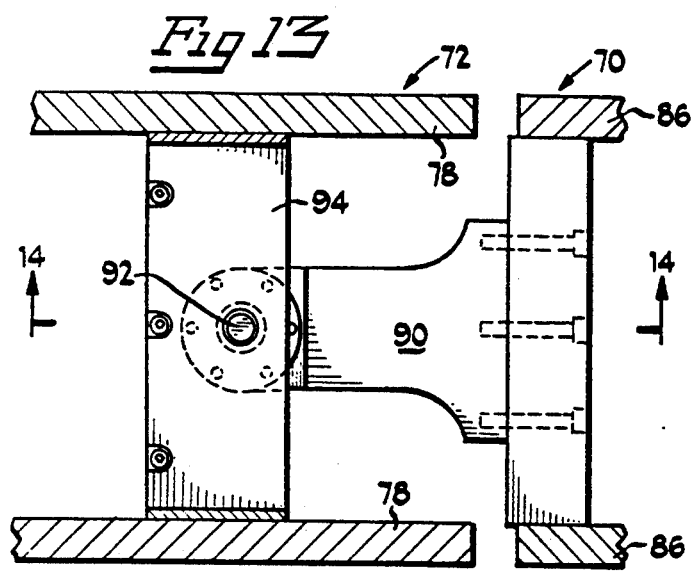
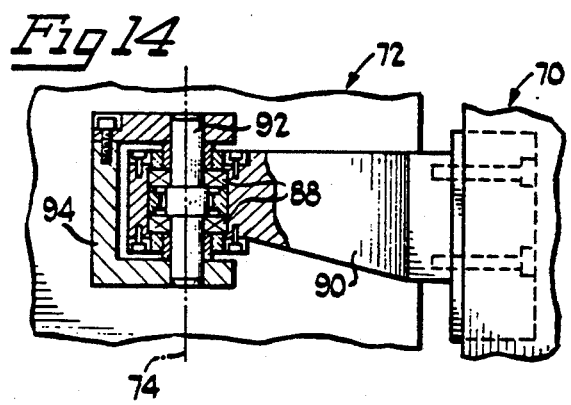
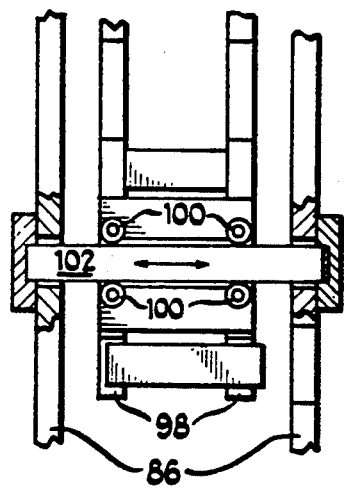
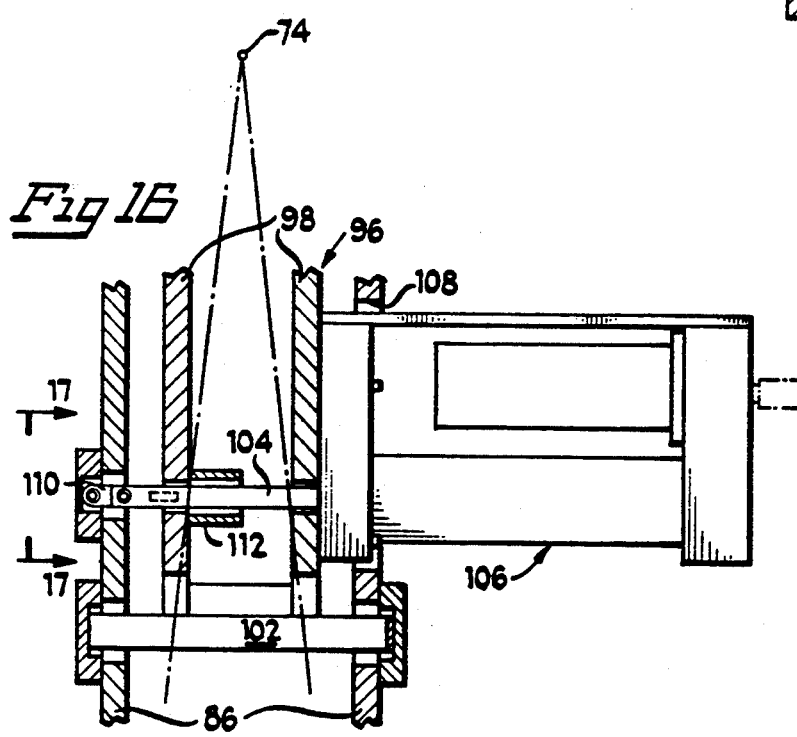
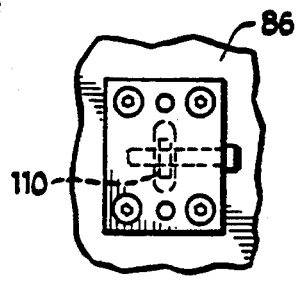

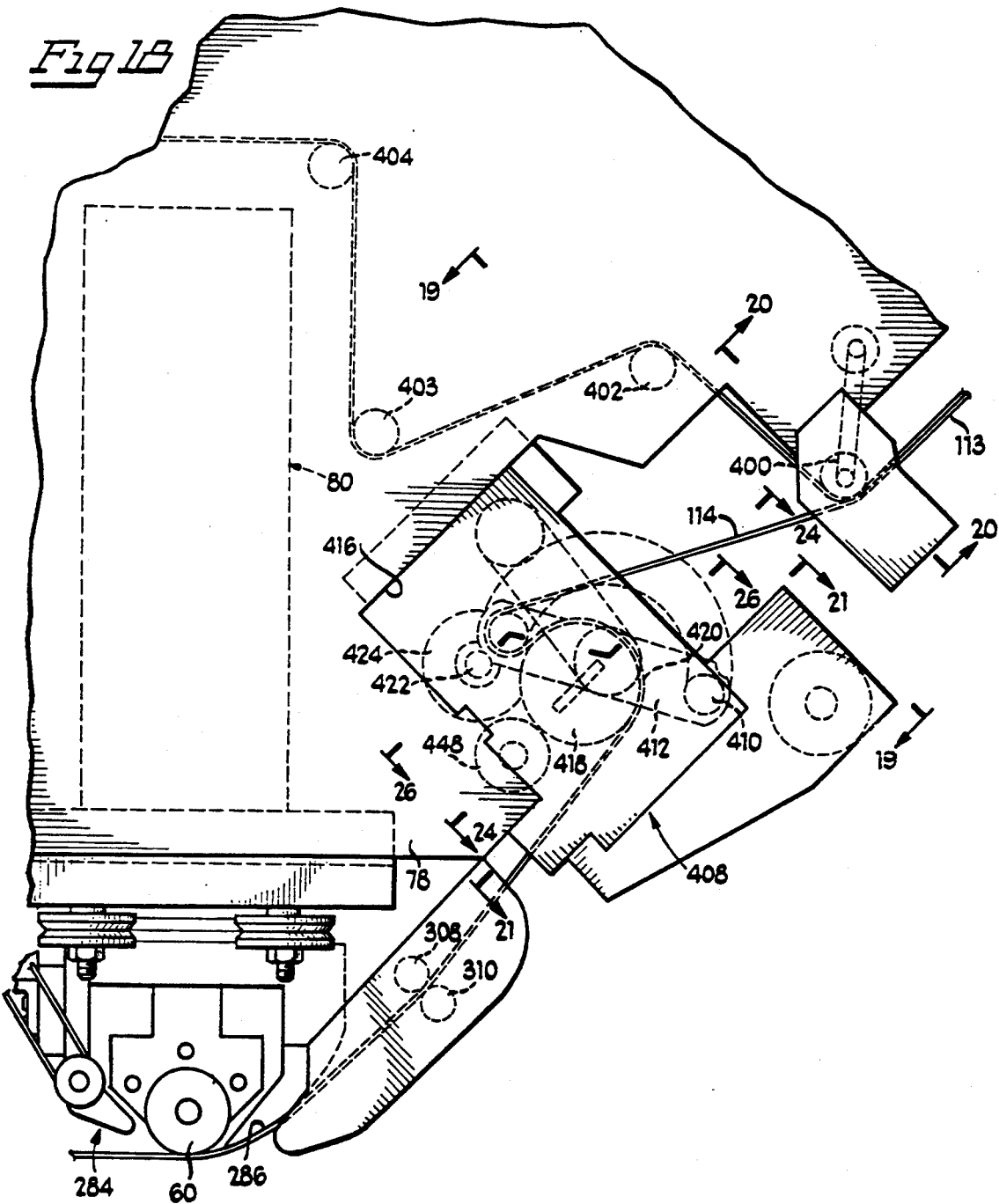

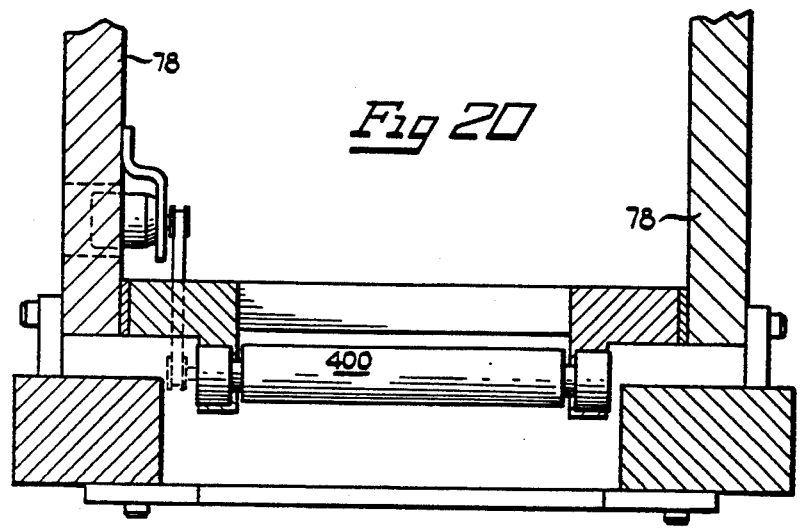
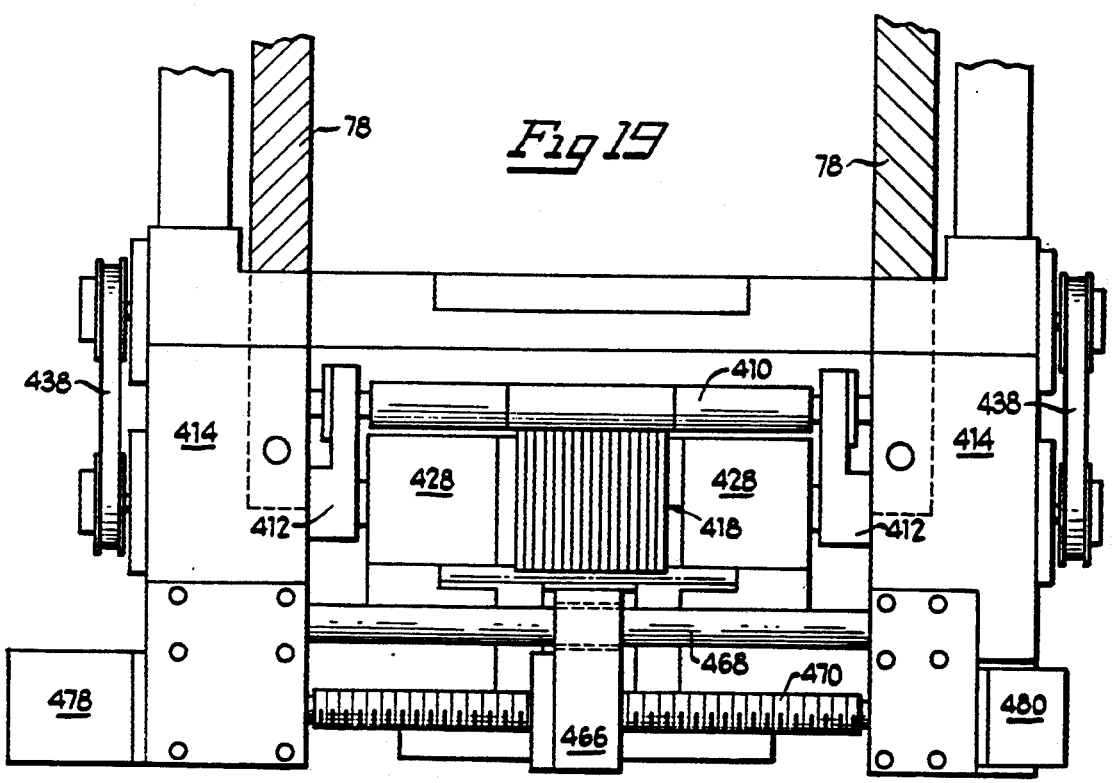

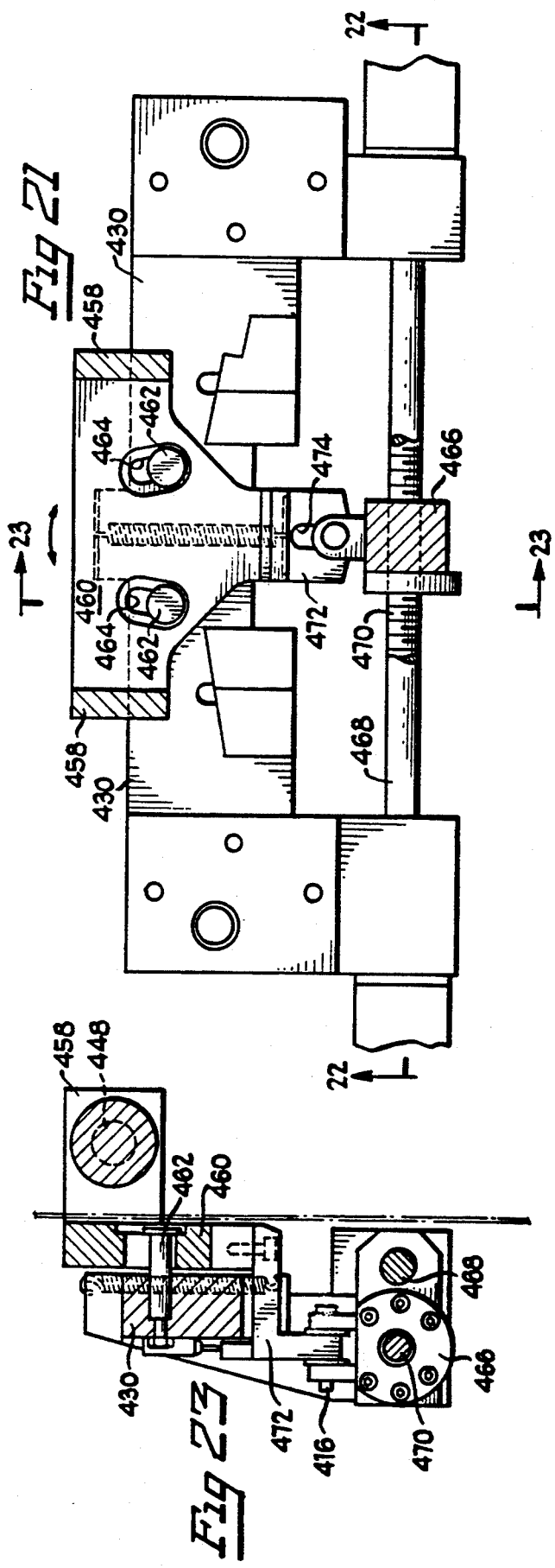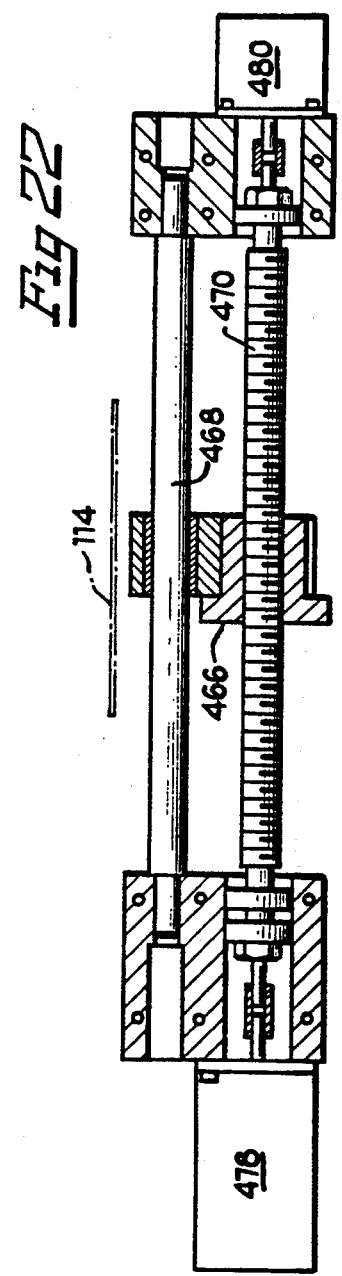

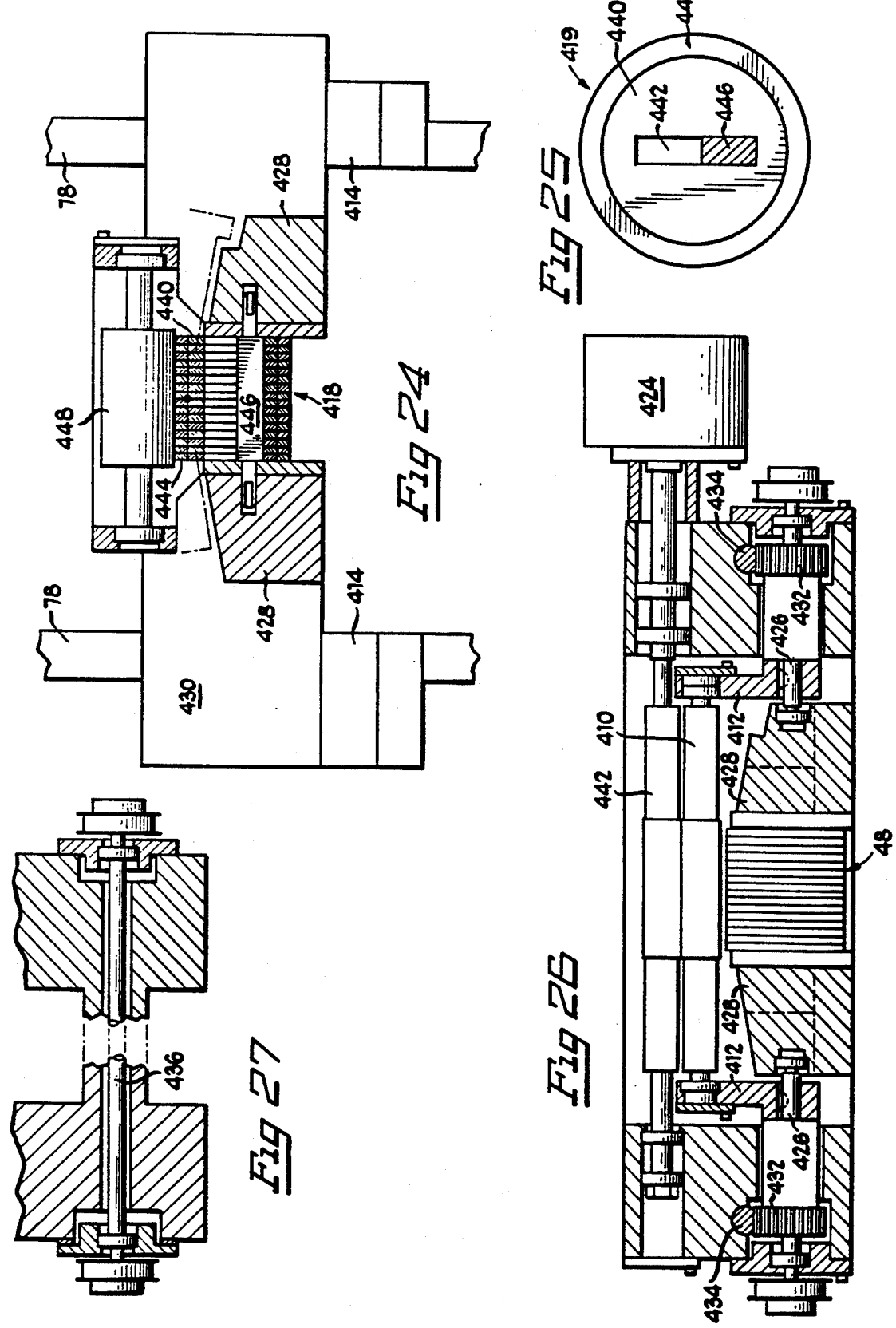

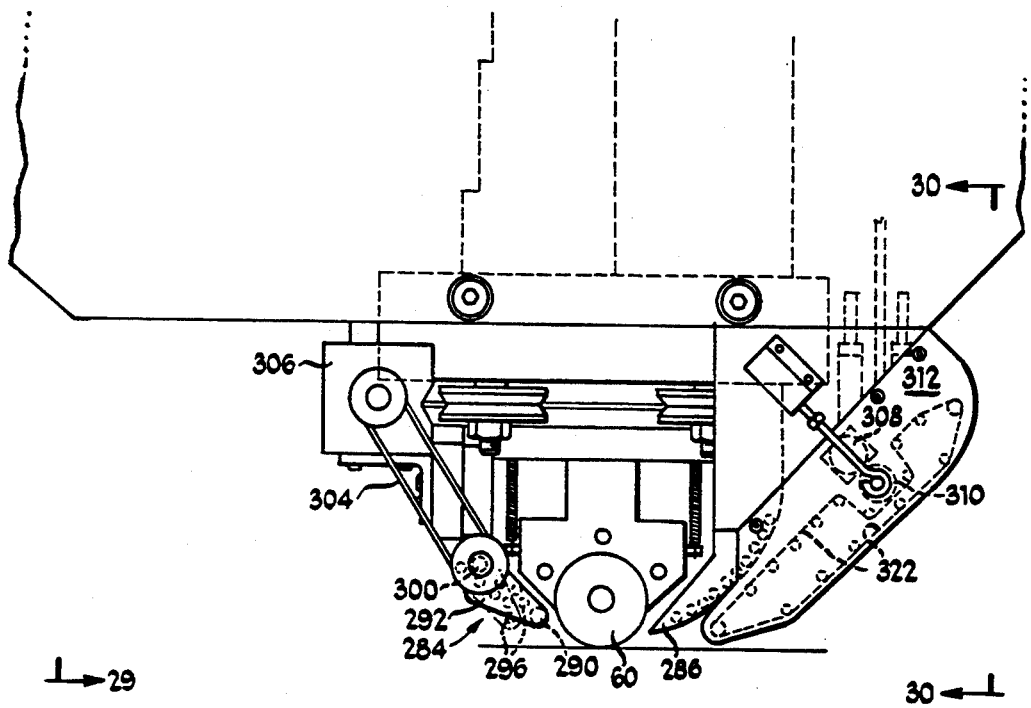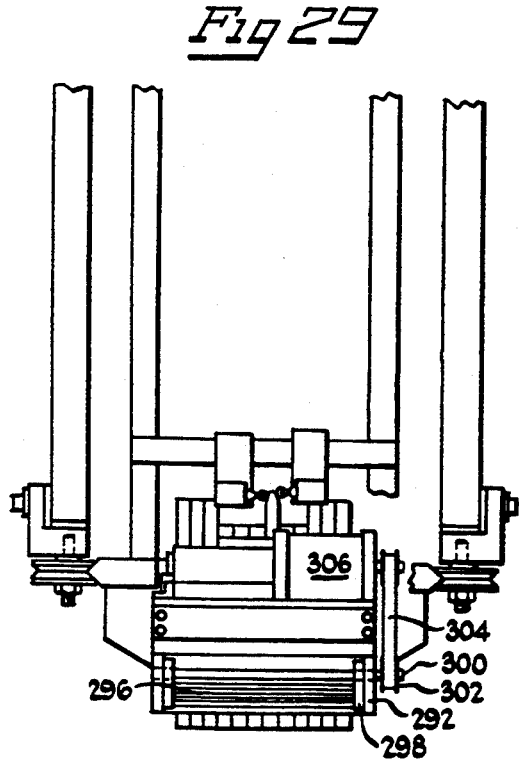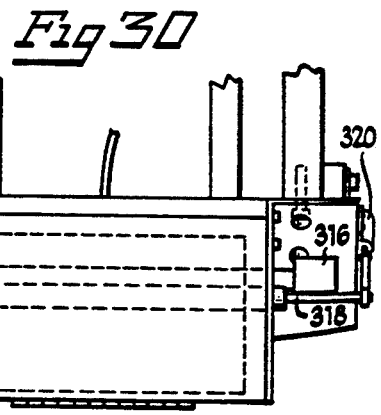

TAPE LAYING HEAD WITH CURVED TAPE LAYING CAPABILITY AND IMPROVED ADAPTIVE STEERING

This invention relates to the manufacture of articles, typically aerodynamic surfaces, from composite tape, and particularly to improvements in tape laying heads to render them more accurately responsive to the requirements of conforming flat composite tape to lay surfaces of compound curvature, and to tape laying procedures to improve known technique for laying composite tape along curved paths.

BACKGROUND OF THE INVENTION

In the context of this invention, the term "composite" denotes a material consisting essentially of high strength fibers or filaments of graphite or other material embedded in a matrix of a thermosetting resin which serves when cured to maintain the alignment of the fibers and their relationship to one another within the matrix as the material is stressed. As applied to the construction of aerodynamic surfaces, composite tapes are resin tapes embedded with fibers or filaments aligned in the longitudinal direction of the tape, multiple courses of which are laid side by side, using a tape head of the general kind to which this invention relates, to construct one ply or layer of a manufactured article, to which successive layers of tape are added incrementally in similar fashion.

The application of this construction technique to contoured surfaces is essentially one of first laying up the laminated structure on a mold having the final surface contour of the part to be fabricated so that the layup will assume the desired shape. The mold with the composite layup applied thereto is then autoclaved. The layers of resinous matrix material merge into a unitary structure during the initial stages of the process and then solidify upon continued exposure to the high temperature in the autoclave as the resin cures.

Upon removal from the mold, that part may be trimmed by machining and otherwise readied for assembly with other parts into an air frame or the like.

As explained in U.S. Pat. No. 4,696,707, Lewis et al., the layup of composite tape upon surfaces of compound curvature is preferably done by determining the natural path the tape would take in being rolled across the lay surface in the direction selected by the part designer for the desired orientation of the fibers embedded in the tape. That patent outlines the technique and a useful algorithm for pre-calculating the natural paths that would be taken by the tape on each course of each layer in the part buildup, working from a mathematical representation of the surface. The pre-calculated path or paths are then converted by appropriate means into machine commands for the coordinated movement of the tape head over the lay surface under numerical control of the multiple machine axes.

In an incremental construction process as described, it is inevitable that manufacturing tolerances, in the tape, in its laying or in the lay surface, will occur and may accumulate in a manner neither uniform nor precisely predictable, to cause deviations of the actual lay surface from the calculated or ideal mathematical representation, particularly in subsequent layers of the layup. This circumstance dictated the further utilization of adaptive control, in addition to programmed numerical control, for the movement of the tape laying head on certain ones of its multiple axes of movement. Such adaptive or reactive control of the tape head, as an adjunct to programmed numerically controlled movement along the pre-calculated natural tape path, is the subject of my prior U.S. Pat. No. 4,750,965 with James J. Pippel as co-inventor.

Inasmuch as the tape head of this invention retains much of the structure and all of the operational capability of the tape head of my prior U.S. Pat. No. 4,750,965 with James J. Pippel, the disclosure of that patent is hereby incorporated by reference as the point of departure for the present invention.

Inasmuch as the important differences between the tape laying functions of the tape head of this invention and that of U.S. Pat. No. 4,750,965 reside in the tape head proper and to some extent in control, a familiarity of the person skilled in this art will be assumed as to tape-laying generally, and detailed description of the invention centered on construction, operation, and method of utilization of the improved tape laying head proper.

It will be understood that the tape head of this invention, like that of U.S. Pat. No. 4,750,965, is movable through the operating space of a tape laying machine along three mutually perpendicular linear axes, X, Y, and Z, the X and Y axes being typically horizontal and the Z-axis vertical.

These linear motions are effected by a gantry arrangement in which the tape head is suspended from a ram vertically movable in a carriage mounted for horizontal movement on the cross rails of a larger carriage movable horizontally in a direction perpendicular to the direction of movement of the lesser carriage which it carries.

The vertical movement of the ram lifts or lowers the tape head away from or toward a formed mandrel positioned within the operating zone of the machine, and, in accordance with machine tool convention, is termed Z-axis movement. Horizontal movement of the tape head by movement of the ram carriage upon the larger carriage is termed Y-axis movement, while movement of the tape head by movement of the larger gantry carriage along its fixed support rails is termed X-axis movement.

These linear movements are driven by gear-and-rack and ball screw drives, with well-known provision where necessary to eliminate backlash, from servomotors with position and velocity feedback to the controller.

In addition to its linear motions, the tape head is movable about two rotational axes.

Alignment of the tape head, suspended as a whole from the lower end of the ram, in the direction of linear travel is effected by rotation on the axis of the ram. This rotation, termed C-axis rotation, is likewise gear-driven, with anti-backlash provision, from a servomotor, with appropriate position feedback from a resolver or the like incorporated with the drive motor.

The second rotational movement, termed A-axis movement and accommodated within the tape head itself, is a sideward rocking movement of the tape head about a horizontal axis perpendicular to the C-axis, and tangent to the underside of the laydown rollers in the vertical mid-plane of the tape head. Rotation of the tape head about the A-axis maintains the axes of the laydown rollers parallel to the lay surface when the tape head is laying tape on a side hill course.

In the arrangement of U.S. Pat. No. 4,750,965, the Z-axis, the C-axis, and the A-axis were each provided with adaptive control in addition to their programmed control in order to deal with unanticipated deviation of the actual lay surface from the numerically defined surface for or from which the programmed path was calculated. Adaptive control of the C-axis, however, was not sufficiently responsive in all circumstances due to the necessity of wielding the mass of the entire tape head, and in some degree to the divergence of the central plane of the laydown rollers from coincidence with the C-axis during side hill layment, so that adaptive rotation about the C-axis induced an adaptive adjustment about the A-axis and resulted in occasional undesirable hunting.

The tape head of U.S. Pat. No. 4,750,965 was also incapable of laying composite tape along other than its natural path, namely, on courses requiring curved paths, because it had no provision for effecting the relative longitudinal displacement of laterally adjacent incremental tape strands that is necessary for laying the inextensible tape in a curved path without puckering or wrinkling.

These operational difficulties and limitations have been largely obviated by the present invention.

SUMMARY OF THE INVENTION

In addition to the five axes of tape head movement common to the tape head of my prior U.S. Pat. No. 4,750,965, the tape head in accordance with this invention incorporates two additional rotational movements.

The more important of these involves the mounting of the segmented laydown roller assembly in a subframe of the tape head which is rotatable independently of the tape head proper on an axis which coincides with the C-axis of the tape head, i.e., the steering or alignment axis, when the tape head is level about the A-axis. This axis of separate rotational steering movement of the laydown rollers is therefore termed the C'-axis.

Its function is several fold, as the rotation of the laydown roller subframe on the C'-axis is servo-controlled during both the programmed and adaptive or reactive modes of control.

Under adaptive control, rotation on the C'-axis replaces adaptive control of the C-axis, i.e., the adaptive response of the major steering or alignment axis that was provided in the machine of U.S. Pat. No. 4,750,965. The laydown roller subframe, being of far less mass than the tape head proper, is not only more responsive to conditions calling for alignment correction, but because its rotational axis maintains a fixed relationship to the tape head proper, irrespective of the position of the tape head about the A-axis, it is more effective in adaptive steering correction than was adaptive control of the C-axis, which remains vertical at all times irrespective of the position of the tape head about the A-axis.

When the C'-axis is in the adaptive control mode, its programmed servocontrol is limited to returning the laydown roller subframe to neutral position on a periodic basis, minimally at the end of each tape run, when the tape head is lifted from the work surface and rotated 180° about the C-axis for the return lay of the tape on an adjacent course.

Further programmed action of the C'-axis, i.e., rotation of the laydown roller subframe, is utilized for laying the tape in other than a straight path. As a general matter, composite tape cannot be steered in a curved path without undesirable wrinkling or buckling of the tape on the inside of the curve. However, as disclosed in German Patent Disclosure DE 40 02 087 A1, a composite tape can be steered in a curved path without puckering if the individual fibers can be displaced relative to each other longitudinally so as to prevent the accumulation of slack in the tape laid on the inside of the curve. This is actually accomplished by transversely differential accumulation of tape before it reaches the laydown rollers, so as to prevent the occurrence of slack on the inside of the curve and to provide a progressively greater length of tape from the inside to the outside of the curved path. For such layment of a complete tape course, programmed control of the C'-axis is used in combination with the turning of the entire head about the C-axis. More specifically, programmed counterrotation of the C'-axis and C-axis is used in accordance with one aspect of the invention to cause the differential relative axial shift of adjacent fibers in the tape necessary to layment of a complete course of tape in a curved path other than the natural path of the tape.

The second additional rotational movement not found in the tape laying head of U.S. Pat. No. 4,750,965 results from the division of the tape head fore and aft into two hingedly articulated parts, one of which carries the supply reel of the two-ply tape, and the other of which carries the laydown rollers, the C'-axis drive, the tape drive (active when the tape head is lifted from the workpiece and at the beginning of each tape course), the A-axis drive, and the paper tape take-up reel.

The axis of the hinge connection between the two parts of the tape head is perpendicular to the run of tape approaching the laydown rollers, so that movement about that axis exerts an edgewise lateral bias on the tape to re-center the tape beneath the laydown rollers in adaptive response to sensed runout.

BRIEF DESCRIPTION OF THE DRAWINGS

FIG. 6 is a side elevation of the same laydown roller subassembly of FIG. 5 with the lower rotational mounting elements removed to show the guides for leading the tape to and away from the laydown rollers, and with the activating cylinders for the laydown rollers illustrated diagrammatically.

FIG. 7 is an enlarged fragmentary illustration of a single laydown roller, partially broken away for the convenient illustration of inner parts.

FIG. 7A is a partial sectional elevation taken along the line 7A—7A of FIG. 7.

FIG. 8 is an underside plan view of the laydown roller subassembly illustrating the lower, load-bearing rotational mounting thereof.

FIG. 9 is a plan view of the laydown roller subassembly particularly illustrating the servomotor drive and position feedback sensor.

FIG. 10 is an end view of the tape edge sensing mechanism seen in elevation on a line of sight along the axis of the tape.

FIG. 11 is a sectional view of the same, taken on the line 11—11 of FIG. 10.

FIG. 12 is an enlarged fragmentary sectional view of the same mechanism, taken on the line 12—12 of FIG. 10.

FIG. 13 is a plan view of the support arm for the articulated foresection of the tape head.

FIG. 14 is a sectional elevation of the same taken along the line 14—14 of FIG. 13.

FIG. 15 is an end elevation of the support track for the sideward movement of the articulated foresection of the tape head.

FIG. 16 is an sectional elevation view of the tape head showing the drive mechanism for the sideward swinging movement of the articulated foresection of the tape head.

FIG. 17 is an enlarged fragmentary side view of the mechanism of FIG. 16 viewed from the position indicated by the line 17—17 of FIG. 16.

FIG. 18 is an enlarged side elevation of the tape head showing the alternate tape path through the differential accumulator employed when laying tape in a curved path.

FIG. 19 is an elevational view, partly in section, of the differential accumulator mechanism taken along the line 19—19 of FIG. 18.

FIG. 20 is an elevation, partly sectioned, of the guide roller which precedes the differential accumulator mechanism in the tape path, and is taken along the line 20—20 of FIG. 18.

FIG. 21 is a fragmentary plan view of the shift roller mechanism of the differential accumulator mechanism taken on the line 21—21 of FIG. 18.

FIG. 22 is a sectional view of the shift roller drive taken on the line 22—22 of FIG. 21.

FIG. 23 is a sectional elevation of the same taken on the line 23—23 of FIG. 21.

FIG. 24 is a sectional plan view of the shift roller mechanism of the differential accumulator taken on the line 24—24 of FIG. 18.

FIG. 25 is an enlarged elevation of an individual roller segment of the segmented shift roller of FIG. 24.

FIG. 26 is a sectional view taken on the line 26—26 of FIG. 18.

FIG. 27 is a timing shaft spaced from but drivingly engaged with the swinging pick-up roller mechanism of FIG. 26.

FIG. 28 is a fragmentary enlargement of the tape path immediately preceding and immediately following the laydown rollers and illustrating particularly the secondary pinch rolls which cooperate with the laydown roller subassembly to complete the layment of a curved course of tape after the tape end has traversed the differential accumulator mechanism.

FIG. 29 is a fragmentary rear elevation of the tape laying head with the paper tape guide in place for normal tape laying.

FIG. 30 is a fragmentary frontal elevation of the tape head showing the laydown rollers in a head-on view and illustrating the mounting of the final pinch rolls used in completing the layment of a curved course of tape.

DETAILED DESCRIPTION OF THE PREFERRED EMBODIMENT

General Orientation

Figure 1:
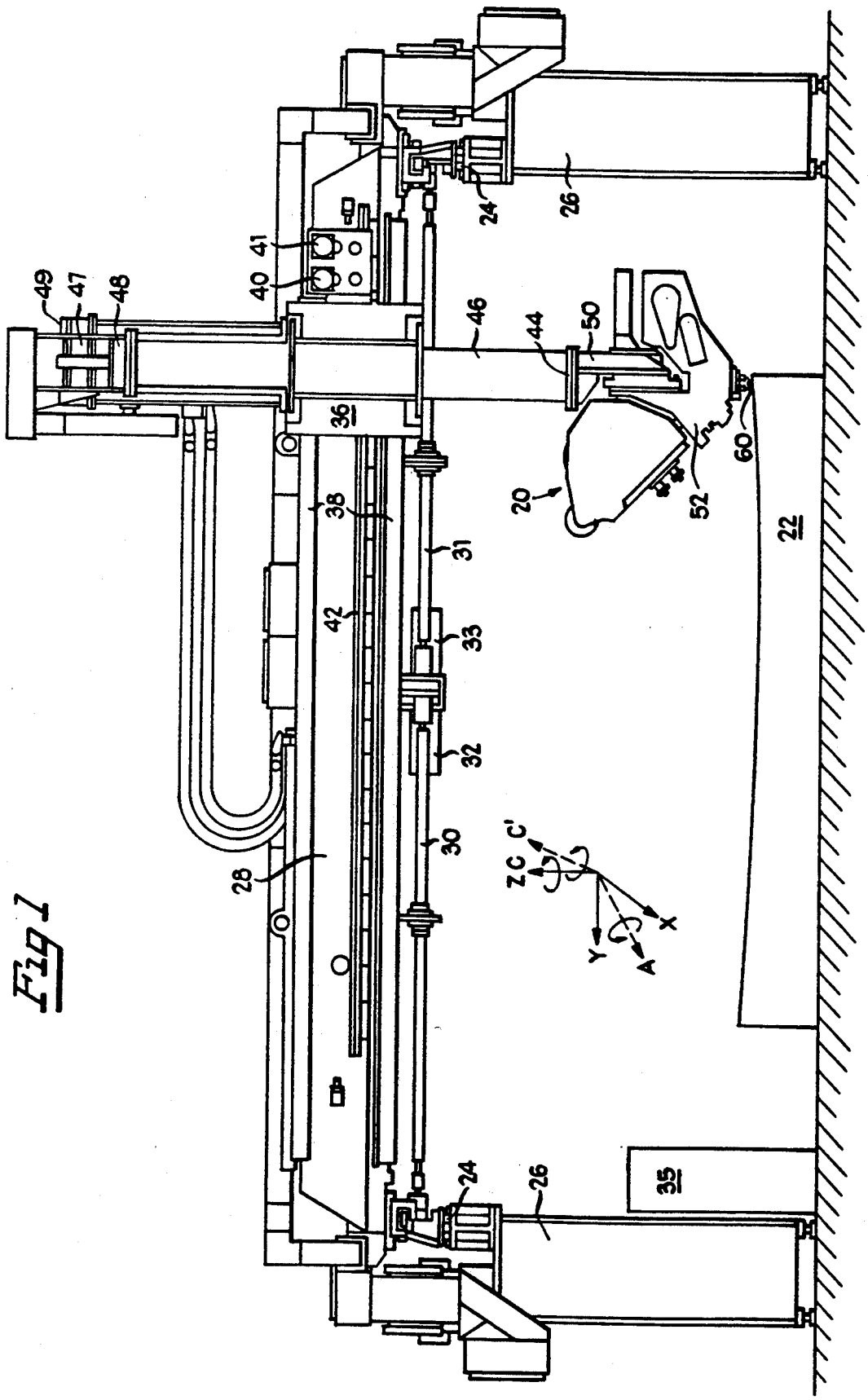
FIG. 1 is an assembly view of the gantry-suspended tape laying head poised to lay a course of tape from right to left on the mandrel positioned beneath the gantry, and also indicating diagrammatically the multiple axes of linear and rotational movement of which the tape head is capable.

The tape laying head 20 of a composite tape laying machine to which the invention is applied is illustrated in FIG. 1. The tape laying head 20 is shown suspended from a gantry mounting, poised for laying a course of tape from right to left upon the curved, upwardly-facing surface of a mandrel 22. The mounting arrangement of the tape head 20 provides five major axes of movement, three linear along axes X, Y, and Z, and two rotational about axes A and C. A-axis motion is rotational about a horizontal line parallel to the X-Y plane through the center of the tape laying head 20 while C-axis motion is rotational about the Z-axis.

The gantry mounting comprises a pair of spaced parallel rails 24 each elevated upon any suitable trestles 26 or other supports and spanned by a cross rail carriage 28 which is driven along the parallel rails in a direction perpendicular to the plane of FIG. 1 to provide what is termed the X-axis movement of the tape head 20. The X-axis drive is a rack and pinion drive (not shown), the pinions of which are mounted at the ends of cross shafts 30 and 31 suspended from the cross rail carriage 28 to engage racks associated with the rails 24, and driven without backlash by a pair of opposing servomotors 32 and 33 mounted on the underside of the cross rail carriage midway of its span. Feedback position sensors (not shown) such as angular resolvers are provided with respect to servomotors 32, 33 to generate signals indicative of the actual position of the tape laying head along the X-axis.

Lateral or Y-axis movement of the tape head 20 is provided by a movable saddle 36 mounted on ways 38 on the facing side of the cross rail as seen in FIG. 1. The saddle 36 is driven along ways 38 by a pair of opposed servomotors 40 and 41, each driving pinions (not shown) engaged without backlash with the opposite tooth flanks of an elongated rack 42 extending along most of the span of the cross rail 28 and atop the lower one of the ways 38. Angular resolvers or other feedback sensors are associated with servomotors 40, 41 to generate signals indicative of the actual position of the tape laying head along the Y-axis.

The tape head 20 is secured to the lower end of a torque tube 44 journalled within a ram 46 vertically slideable in the saddle 36, the torque tube 44 being rotated by servomotor 47 through a zero backlash gear drive 48 to provide the rotational movement of the tape head 20 about a vertical or C-axis. The ram 46 is also vertically movable within the saddle 36 by a servomotor and ball screw drive 49 (not shown in detail) to provide vertical or Z-axis movement of the tape head 20. The actual position of the tape head 20 with respect to the Z-axis and C-axis is derived from feedback position sensors, such as resolvers or the like, associated with servomotors 47 and 49.

Figure 2:
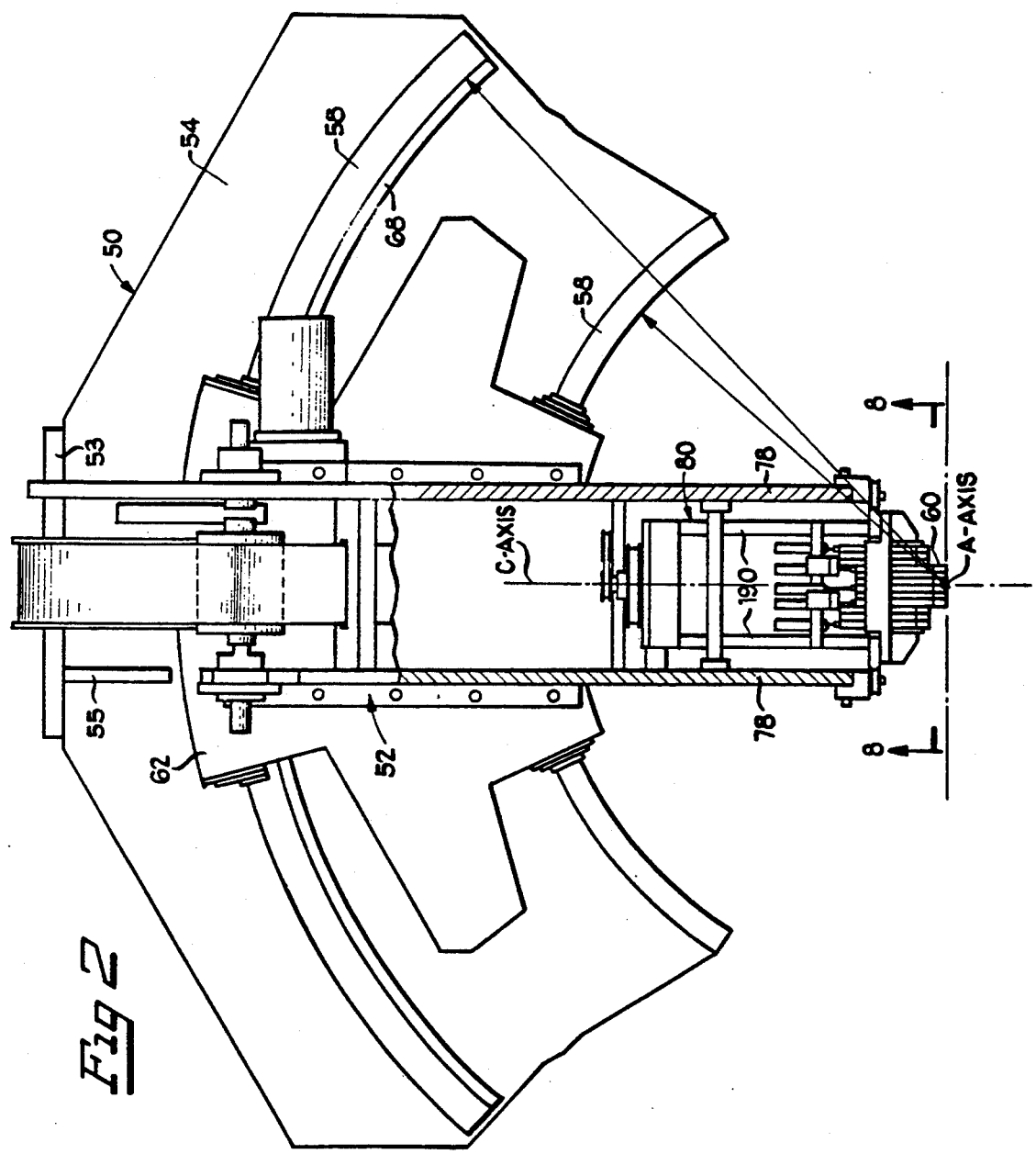
FIG. 2 is an end view of the oncoming tape laying head partially sectioned to illustrate inner portions of the mechanisms normally hidden from view.
Figure 3:
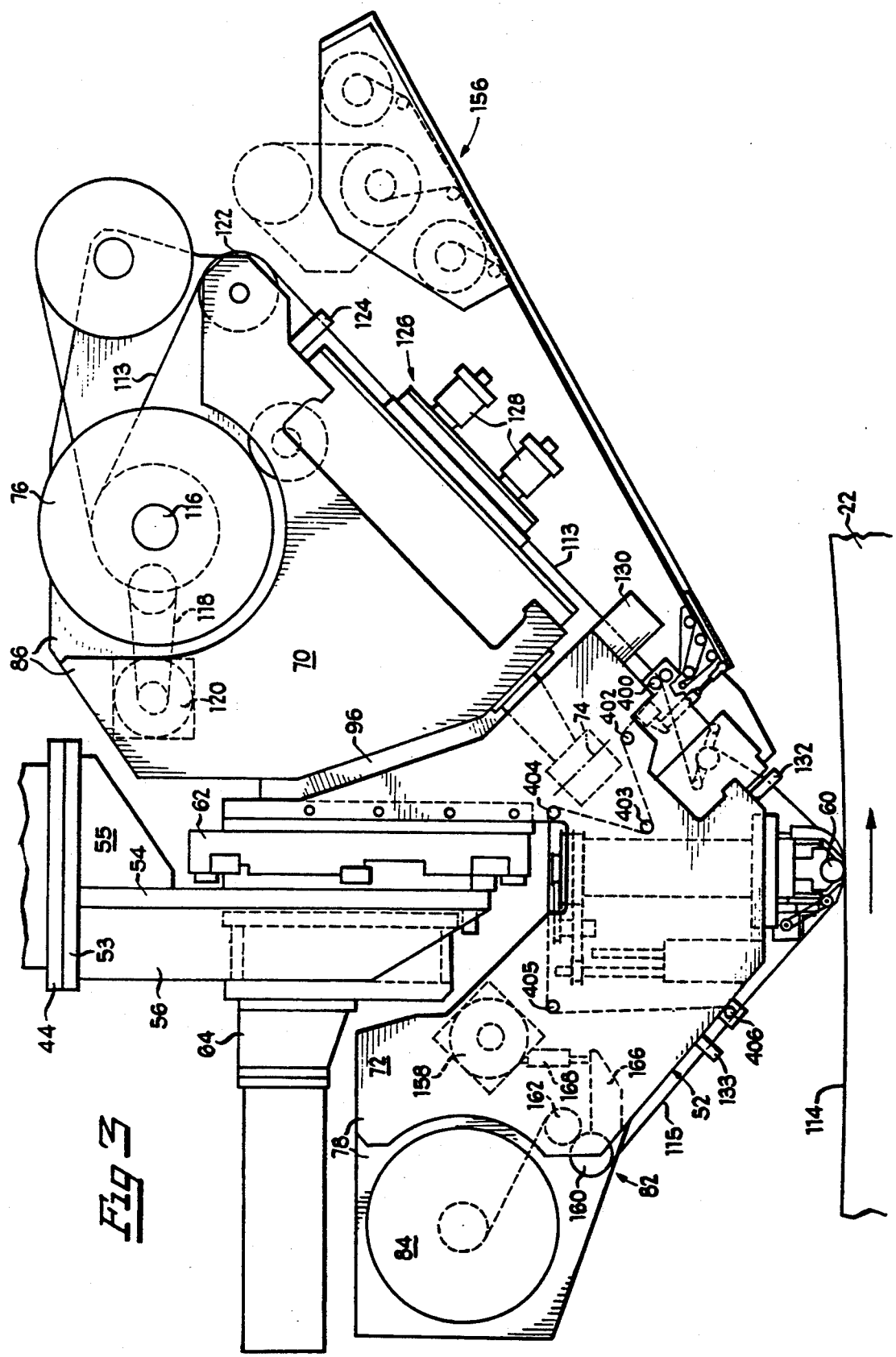
FIG. 3 is a side elevation of the tape laying head viewed from the right side which is also the front side of the machine from the standpoint of the loading and unloading of the tape supply and take-up reels.
Figure 4:
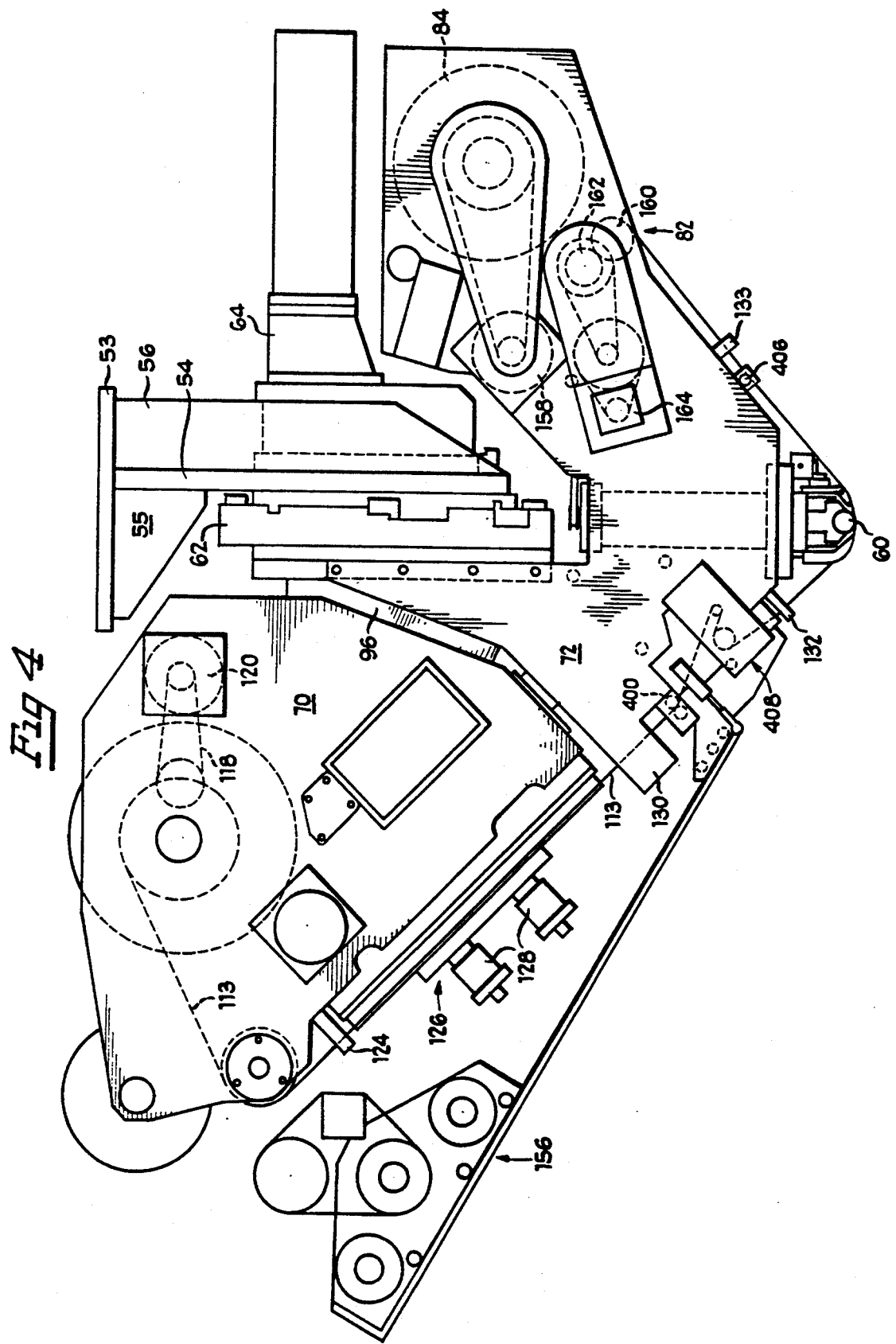
FIG. 4 is a side elevation of the tape head taken from the left side and corresponding to the view of the tape head seen in FIG. 1.

The fifth axis of movement of the tape head, termed A-axis rotational movement, is best appreciated by comparing FIGS. 2, 3, and 4, which illustrate the three-part frame of the tape head 20, including a suspension frame 50 and a two-part saddle-shaped frame 52 which carries the tape-handling mechanism. The suspension frame 50 comprises a horizontal mounting plate 53 for securing the frame to the torque tube 44 of the ram, and a broad vertical faceplate 54 (FIG. 2) braced to the mounting plate 53 by corner brackets 55 on the front side of the faceplate and plate stiffeners 56 on the rear. On its front side, the faceplate 54 carries a pair of precision ways 58 concentric upon the A-axis of the machine. The A-axis is tangent to the underside of the segmented tape laydown roller 60 at its axial center when the roller is in laying position, as later explained. The A-axis is perpendicular to the plane of FIG. 2, and projects as a point in that plane.

The saddle-shaped frame 52 of the tape laying head 20 includes a turntable 62 mounted on the precision ways 58 of the suspension frame 50. The turntable 62 is rotated about the A-axis by a servomotor and gear box 64 mounted on the faceplate 54 which drives two pinions (not shown) engaged with zero backlash with the opposed flanks of a circular rack 68 secured on the mating face of the turntable 62 (FIGS. 3 and 4) beneath the upper one of the ways 58. The precision ways 58 on the suspension frame 50 preferably provide 30° of A-axis movement either side of center, and the rotational drive of the torque tube 44 in the ram 46 of the machine is designed for C-axis rotational movement of 190° in either direction of rotation from a zero reference. A feedback position sensor such as a resolver or the like associated with the servomotor 64 provides a signal representative of the actual positions of the tape head 20 with respect to the A-axis.

There is an internal coordinate system for positioning the tape head 20 which is based on the center point of the laydown roller 60. The origin for the internal coordinate system is floating or movable so that the machine may be used easily with many different size mandrels with precision. The signals from the feedback position sensors for the X, Y, Z, A, and C axes are used to locate the position in space of the center of the tape laydown roller 60. By matching these positions with the preprogrammed positions from a controller unit 35 (FIG. 1), the tape head 20 can be moved to lay tape courses on the mandrel surface and build plies of the courses into laminated articles.

The Tape Head Proper

The saddle frame 52 of the tape head proper differs from that of prior U.S. Pat. No. 4,750,965 in that the frame is divided fore and aft into two articulated sections 70 and 72 which are hinged about an axis 74 perpendicular to the axis of that portion of the tape run which proceeds toward the laydown rollers. This articulation permits the lateral swinging movement of the entire foresection 70 of the saddle frame, which carries the tape supply reel 76, to correct sensed drift of the tape from the centerline of the laydown rollers 60 carried by the aft section 72 of the frame.

The aft section 72 of the saddle frame (FIGS. 2 and 3) comprises a pair of spaced parallel side plates 78 each secured to the turntable 62, and supporting between them the laydown roller subassembly 80, the tape drive 82, and the paper tape take-up reel 84. The foresection 70 is similarly fabricated of two parallel side plates 86, spaced equally with those of the aft section and separated from them longitudinally a sufficient distance to permit the aforementioned lateral swing of the foresection about the axis 74 to re-center the composite tape en route to the laydown rollers.

The hinge joint between the two frame sections (FIGS. 13 and 14) is provided by a pair of spaced roller thrust bearings 88 secured in an arm 90 extending rearwardly from the foresection 70 of the frame with their inner races snugged up to the opposite shoulders of an enlarged diameter portion at the center of a stub shaft 92 which serves as the pintle of the hinge. The ends of the stub shaft 92 are retained by press fit in bored holes in the upper and lower flanges of a U-shaped cross-member 94 extending between and secured at its ends to the side plates 78 of the aft section.

The principal weight of the foresection 70 and the equipment it carries is transferred directly to the turntable 62 by a support bracket 96 secured to the turntable 62 and similarly comprised of two parallel plates 98 spaced more narrowly than those of the foresection so as to fit between them with sufficient side clearance to allow for relative sideward movement. Mounted on the bracket plates 98 are spaced roller pairs 100 (FIG. 15) which engage the upper and lower surfaces of a bearing bar 102 extending between and secured to the side plates 86 of the foresection.

This arrangement of bearing supports and clearances permits a sideward swing of the foresection about the axis 74 of about 7° in either direction from center under the influence of a servodrive and in response to sensors which read the edges of the tape en route to the laydown rollers, which will subsequently be described in greater detail.

The servodrive for the corrective swing of the foresection 70 (FIGS. 16, 17) takes the form of a linear actuator, i.e., a rod 104 which is an extension of a ball screw having threaded engagement with a nut secured within a tube driven through suitable anti-backlash gearing by a servomotor. The servomotor and linear actuator assembly 106 is mounted to the support bracket 96, and extends outwardly through a port 108 provided in the left side plate 86 of the foresection 70. The drive rod 104 is secured at its distal end to the right-hand side plate of the foresection 70 through a short link-and-clevis connection 110 aligned to accommodate the slight rotation of the foresection relative to the support bracket. A ball-bushing 112, mounted on the support bracket between its two plates, steadies the distal end of the rod 104 to avoid binding its associated screw and drive nut, not seen within the lead screw housing of the actuator assembly 106.

The Tape Path Within The Tape Head

Carried high on the foresection 70 of the saddle frame is the supply reel 76 of the two-ply tape 113 comprising a composite tape 114 and the paper tape 115, with the paper tape of each two-ply winding innermost. The reel is supported upon a spindle 116 cantilevered from the left side plate 86 while the right side plate is cut away to facilitate reel replacement. The reel is driven by a timing belt 118 from a torque motor 120 in response to tape tension resulting either from the forward motion of the tape laying head 20 in the act of laying the tape, or from the tape drive 82 on the aft section 72.

Upon leaving the supply reel from its upper side, the two-ply tape 113 passes around a guide roll 122 to begin the normal long straight run diagonally downwardly and rearwardly to the laydown rollers 60. The laydown rollers press the composite tape 114 onto the lay surface, and the paper tape 115 is immediately thereafter stripped from the composite tape to be conveyed diagonally upwardly and rearwardly through the tape drive 82 and thence to the take-up reel 84.

On the downward run of the two-ply tape toward the laydown rollers, the tape first passes an inspection station 124, which scans for foreign matter on the surface of the composite tape. It then enters the cutting station 126, where, on call from the controller 35, one or more of two longitudinally and transversely translatable vibratory chisel knives 128 sever the composite tape 114 at the desired angle and in the desired shape to fit the prescribed periphery of the layer of composite material being laid. The controlled penetration of the vibratory knives severs the composite tape 114 while leaving the paper backing tape 115 intact.

The two-ply tape 113 next enters a heating station 130, where it is warmed from both sides to render the resinous matrix of the composite tape momentarily tacky.

In normal continuous movement toward the laydown rollers 60, the two-ply tape 113 passes then through a photoelectric tape edge sensor 132, which is positioned as close as practicable to the laydown rollers 60, as it provides the adaptive control of the servodrive of the foresection 70 of the saddle frame to swing the section right or left as needed to re-center the tape beneath the laydown rollers, with which the tape edge sensors are laterally aligned.

The tape edge sensors 132 are shown in detail in FIGS. 10, 11, and 12. The active elements are a pair of opposed, inwardly open C-frames 134 and 135 positioned to encompass the edge of the tape 113 between their upper and lower arms. In the upper arm of each is an elongated light emitter 136 and in the lower arm an elongated array 138 of light-sensitive cells which are activated in greater or lesser number as the edge of the tape 113 shifts laterally relative to the sensor frames.

The sensor frames are supported by lower carriage blocks 140 mounted upon slide shafts 142 and engaged respectively by separate right- and left-handed threads of an adjusting screw 144 engaged with the carriage blocks 140 and extending outwardly through the right side plate 78 of the saddle frame where the screw extended is fitted with a knurled handwheel 146.

The entire assembly as thus far described is supported by upper carriage blocks 148 both slideably supported upon a pair of slide shafts 150 and held in fixed spacing thereon by the slide shafts 142 for the lower carriage blocks. One of the upper carriage blocks receives an adjusting screw 152 secured axially but nevertheless rotatable in the right side plate 78 of the saddle frame, with a knurled handwheel 154 for turning the screw.

It will be appreciated from FIG. 10 that adjustment of the lesser screw 152 shifts the entire assembly sidewardly relative to the tape 113, indicated in broken line in FIG. 10, and that the turning of the larger screw either spreads the sensor frames 134 and 135 or brings them into closer proximity. The latter adjustment is employed to accommodate tape of different widths, three inch and six inch being common, while the former centers the sensor assembly on the centerline of the laydown rollers.

In normal operation, the severing of the composite tape 114 for the end of a particular course simultaneously prepares the leading edge of the next course for layment in the opposite direction when the tape head is lifted from the lay surface by the Z-axis, indexed one tape width by movement in the X-Y plane, and rotated 180° about the C-axis, with such opposite adjustment on the A-axis as may be required. When, however, the complementarily severed end of the unlaid tape is not suited for the next course of the program, or when a section of tape along one edge must be removed to accommodate some mid-course installation in the manufactured composite part, the scrap tape produced in the process must be removed to prevent fouling of the apparatus or the lay surface.

To remove scrap pieces of tape, a scrap collector 156 (FIGS. 3 and 4) is underslung from the foresection of the tape head. When called upon, its tape-engaging lower end is elevated to cause a roll to lift the two-ply tape from its normal run. Immediately before the intrusive roll of the scrap collector, however, is a guide roller 400 which is tangent to the tape run, and in contact with the paper backing tape. When the two-ply tape is lifted by the scrap collector roll, the tape makes an abrupt turn about the guide roll, releasing the scrap to fall into the collector, which is then lowered to allow the two-ply tape to resume its normal alignment.

As the tape head 20 is moved along a path or track, a tape course is laid on the surface and the paper backing tape 115 is simultaneously peeled or released from the composite tape 114 as the latter is laid. The paper backing tape 115 then proceeds diagonally upwardly, passing through a second photoelectric tape edge sensor 133, essentially identical to the previously described tape sensor 132, and is trained in a S-shaped path through the tape drive 82 and thence to the paper take-up reel 84 at the back end of the aft section 72 of the tape head. The second photoelectric tape edge sensor 133 provides the adaptive control for the C'-axis in a manner yet to be described.

As with the tape supply reel 76, the paper take-up reel 84 is driven by a timing belt from a torque motor 158 and is regulated to maintain a predetermined level of tension on the paper backing tape 115. The tape supply reel and the paper take-up reels are each scanned by proximity sensors (not shown) which sense the changing radius of the tape on each reel to adjust their respective torque motors to maintain the preset tension.

The composite tape 113 is drawn from the supply reel 76 at times merely by the advancing movement of the tape head 20 over the lay surface after the leading end of the tape is anchored to the lay surface, but is additionally positively driven at the beginning and at the end of each tape course, i.e., before sufficient adhesion is developed between the composite tape 114 and the lay surface to anchor the beginning end of the tape to the lay surface as the tape laying head 20 moves away, and is also positively driven near the end of the tape course when the adhesion of the composite tape 114 to its paper backing tape 115 may be insufficient to prevent separation of the precut end of the composite tape from its backing. Also, between the end of one course and the start of the next course, the laydown roller 60 is lifted from contact with the lay surface, and the tape is positively driven back and forth to reposition and realign the tape within the tape head 20.

The tape drive 82 comprises two rollers 160 and 162 about which the paper backing tape makes the S-turn en route to the take-up reel 84. The upper one of these rollers, roller 162, is driven by a reversible servomotor 164 seen on the left side elevation (FIG. 4) mounted on the outside of the aft section 72 of the tape head. The lower roller 160, which functions as a pinch roller, is mounted on a rocker arm 166 (FIG. 3), the opposite end of which is connected to a double-acting, short stroke air cylinder 168 which is energized either to open or close the nip between the two rollers.

When it is desired to drive the tape in either direction, the air cylinder 168 is energized to close the nip between the rollers 160 and 162, and the servomotor 164 is energized in the appropriate direction, unloading one or the other of the torque motors 158 and 120 serving the take-up reel 84 and the supply reel 76, respectively, causing one to play out tape and the other to reel it in. The same arrangement, i.e., with the nip of the two rollers closed, similarly serves as a brake which is set whenever the tape head is lifted out of contact with the lay surface.

When the air cylinder 168 is energized to open the nip between the two tape drive rollers for the intermediate portion of the tape course, the releasable backing paper remains entrained in its reverse bend about the two rollers. When the tape is moving relative to the tape head 20 by means other than the drive motor 164, as during the laying of a tape course, the wrap of the backing tape around the drive roller 162 generates sufficient friction to drive a resolver attached to the motor to record the amount of tape laid by measuring the number of turns of the drive motor 164, whether or not the drive motor is energized to draw tape from the supply reel.

The Laydown Roller Subassembly and C'-Axis

The laydown roller subassembly 80 is a subframe which carries the laydown rollers 60 for steerability independently of the tape head frame about an axis, the C'-axis, fixed within the aft section 72 of that frame, and sidewardly tiltable with the tape head frame in a vertical plane about the A-axis. While it coincides with the C-axis when the tape head experiences no sideward tilt about the A-axis, it diverges from the C-axis by rotation of the entire tape head frame about the A-axis, which both the C-axis and C'-axis intersect in a common point. Thus, as the A-axis drive is activated to tilt the laydown rollers back into parallelism with the lay surface when on a side hill course, the C'-axis is equally tilted to restore its perpendicularity to the lay surface immediately beneath the laydown rollers, i.e., along a line transverse to the tape course.

Structurally (FIG. 5), the steerable subframe 80 comprises a pair of spaced, vertical, rectangular side bars 190 spanned at their upper ends by a top bar 192 and two cross bars 194, all screwed at their ends to the side bars 190 and forming with them a downwardly open box structure. Screwed centrally to the top bar is a drive pulley 196 having an upwardly extended stub shaft 198 journalled in a needle bearing 200 seated in a bridging plate 202 which spans the side plates 78 of the aft section 72 of the tape head frame. Secured to the stub shaft above the bridge plate 202 is a smaller pulley 204 connected by timing belt 206 to a rotary encoder 208 supported by an extension of the bridge plate 202 (FIG. 9).

The drive pulley 196 is similarly connected by timing belt 210 to the C'-axis servomotor 212 mounted on a bracket 214 secured to the inner wall of the right side plate 78 of the aft section of the tape head. Compare FIGS. 5, 6, and 9.

Near their lower ends, the vertical side bars 190 are connected by a guide plate 216 for the piston rods of the activating cylinders 218 of the laydown roller yokes 220, and by a mounting bar 222 for the linear sensors 224 (LVDT's) which sense the vertical positions of certain specific laydown roller yokes within the subframe, as well as for a Z-axis safety switch to prevent collision with the lay surface.

Screwed to the bottom of each subframe side bar 190 is a circularly arcuate base plate 226 whose V-shaped circular arc segment is engaged with the V-grooves of a pair of guide rollers 228 journalled on the vertical axes of bushings secured to a bracket 230 screwed to the bottom edge of the adjacent side plate 78 of the aft section. The V-grooved rollers 228 support the weight of the subframe and laydown roller segments, and guide their turning movement. Shims between the guide roller mounting brackets 230 and the side plates 78 of the aft section provide adjustment to maintain alignment and clearance for the turning of the subframe.

Secured by screws to the underside of the arcuate base plates is a carrier block 232 for the twelve individual laydown roller yokes 220. The carrier block takes the form of two milled halves which are joined on the transverse centerline of the subframe to frame a central rectangular enclosure 234 to house, and to guide the vertical movement of, the twelve laydown roller yokes 220 ganged side-by-side in mutually supporting relation for individual and collective movement relative to one another and to the carrier block 232. Each block half is milled to provide a flange 240 at each side to receive the anchoring screws which secure the housing to the arcuate base plates, and to form downwardly extending buttresses 242 which provide flank support to the ends of the ganged roller segments.

The sturdiness of the laydown roller subframe 80, its mounting in the aft section 72 of the tape head 20, and the individual roller segments yet to be described, is explained by the fact that they constitute the means for pressing the tacky composite tape into intimate contact with the lay surface 22.

Each individual roller yoke 220 (FIGS. 7 and 7A), formed from plate stock, comprises a head 236 having an upwardly extending shank 238 of rectangular cross section. The head 236 has a downwardly-open semicylindrical seat 240 sized to receive a centerless roller segment 60 with running clearance. The roller segment 60 is engaged from above by three ball bearings 242 housed in an arcuate peripheral slot 244 on the midplane of the yoke and adjustably positioned therein on eccentrics 246 adjustable to align the centerless roller segment 60 on the centerline of the yoke. Spring leaves 248 mounted on the outsides of the head 236 support the roller segment 60 against gravity when lifted free.

Each interior roller yoke 220 carries on one side thereof a wear shim 250 having the general outline of the roller yoke and shank but covering all but the lower marginal portion of the roller segment 60 protruding from the yoke. Those segments constituting each half of the gang of twelve are positioned with their wear shims 250 on the side facing away from the center of the gang with the sixth and seventh rollers of the gang in face contact on the turning axis of the laydown roller subframe, the C'-axis, the lateral positioning of the gang of roller assemblies for that purpose being accomplished by shim plates 252 in the guide housing.

In its non-operating position, each roller segment 220 is urged upwardly in the carrier block by tension springs 254 housed partially in throughholes 256 in the carrier block 232, being anchored at their upper ends therein on the shanks of cap screws 258 and similarly anchored at their lower ends by cap screws 260 protruding from the yoke head 236. When free to do so, the springs 254 elevate the yoke head 236 until its shoulders engage the underside of the carrier block 232.

The operative position of each roller assembly is determined by a pair of air cylinders 262 and 264 (FIG. 6), aligned back to back in a common housing having piston rods at each end, and being interposed ultimately between the top plate 192 of the laydown roller subframe 80 and the top of the roller assembly shank 238.

The piston rod of the upper cylinder 262 is secured to a load cell 266 mounted on the underside of the top plate 192, while the piston rod of the lower cylinder 264 is joined to the shank of a hardened checking ball 268 by a sleeve coupling 270 received in a slide bushing in the cylinder guide plate 216.

The upper cylinder is single acting and permanently vented for the extension of its piston rod under pressure. Its piston is sized to maintain full extension when pressurized.

The lower cylinder is double acting, sized slightly smaller than the upper cylinder, and valved to extend its piston rod for normal laying of the tape, with the underside of the piston vented. For normal laying, i.e., with both cylinders pressurized for extension, the head space above the lower piston is approximately 0.020 inches. Thus, when the beginning of the cut at the end of a tape run is reached, the laydown rollers are sequentially unloaded in accordance with the angle of the cut by sequentially shifting the spools of the control valves for the lower cylinders 264 to pressurize their pistons from below, while venting them above, to lift the laydown roller segments 60 in sequence by the amount of the aforementioned head space.

Figure 5:
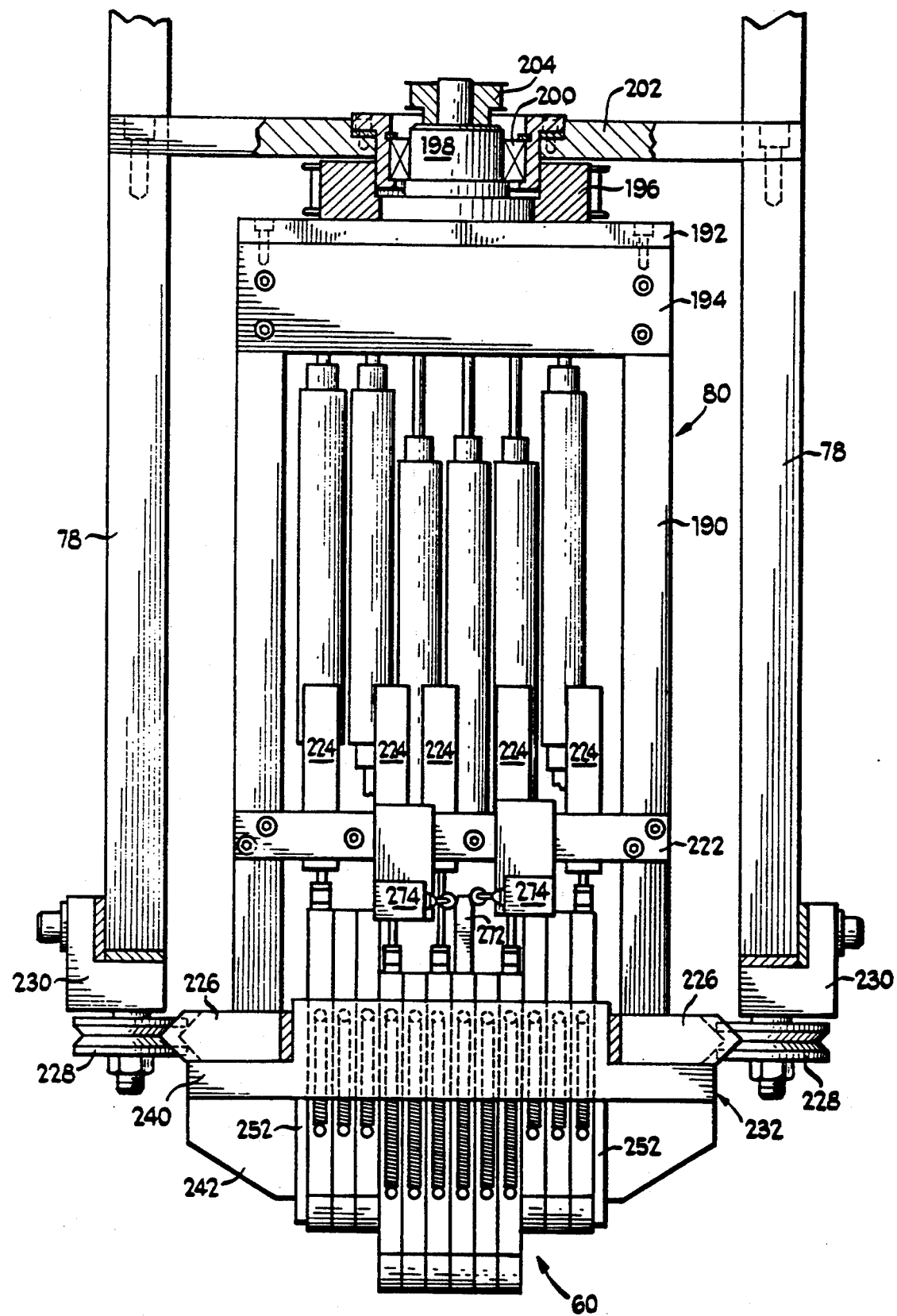
FIG. 5 is a rear elevation, partly in section, of the laydown roller subassembly, the device which presses the tape down onto the lay surface, showing the laydown roller subassembly mounted for limited rotation independently of and with respect to the tape head as a whole.

The sensing elements associated with laydown roller segments 220 are six in number. These include an angled arm 272 extending rearwardly from the top of the yoke shank of one of the two roller segments flanking the centerline, and then upwardly to present its upper end to the plungers of a pair of opposed microswitches 274. These switches are employed as fail-safe devices to interrupt power if the tape head nears collision with the lay surface (FIG. 5).

The remaining five sensors 224 detect and signal the vertical positions, respectively, of the first, fourth, sixth, ninth, and twelfth roller segments. Each of the sensing devices 224 is a linear variable differential transformer whose coil is mounted on the lower cross bar 222 of the roller subframe 80, and whose core rod 278 is attached at its lower end to an arm 280 extending rearwardly from the top of the shank 238 of its respective roller segment 220.

The sensors 224 of the fourth and ninth roller segments control the A-axis when laying three-inch wide tape, and the sensors associated with roller segments first and twelfth perform that function for the laying of six-inch wide tape.

The similar sensor associated with the sixth segment, i.e., one of the two segments flanking the center of the laydown assembly, provides position feedback for the programmed control of the Z-axis servodrive.

The division of the laydown roller into multiple segments facilitates the adaptive sensing of the degree of tilt about the A-axis that may be required to realign the roller segments on a line of centers parallel to the transverse slope of the tape path, and to bring the C'-axis, i.e., the steering axis of the laydown roller subframe, into perpendicularity with that transverse slope, but, more importantly, the segmented construction accommodates the transversely sequential removal of pressure for the laying of the tail end of each course, to avoid the simultaneous pressing of the leading end of the next course onto the lay surface. It also permits the use of composite tapes of various widths, typically, three and six inches without changing rollers.

The laydown rollers 60 are flanked fore and aft (FIGS. 6, 28, 29) by guide roller sets 282 and 284 which lead the composite tape 113 under the laydown rollers 60 and convey the paper tape 115 away from the laydown rollers along a gentler curve than if the tape approached and left the laydown rollers 60 directly. The reason for this is that the relatively small radius of the laydown roller tends to peel the leading end of the composite tape 114 from the paper backing tape 115, which would be undesirable when driving the tape back and forth, when lifted from the lay surface between courses, to re-center the tape beneath the laydown rollers for the start of a new course.

The lead-in rollers 282 are journalled in curved side plates 286 screwed to a cross bar 288, which in turn is screwed to the carrier block 232.

The aft series of rollers 284 comprises a single fixed axis roller 290 journalled at its ends in fixed arms 292 secured as a yoke to a mounting block 294 screwed to the back side of the carrier block 232, and a number of lesser rollers 296 journalled in a pair of swing arms 298 flanking the inside surfaces of the fixed arms 292, and secured to a cross shaft 300 journalled in the fixed arms. Compare FIGS. 28 and 29. The cross shaft 300 is extended on the right-hand side of the machine to mount a pulley 302 for a timing belt 304 running upwardly and rearwardly to the like pulley of a short stroke hydraulic rotary actuator 306.

The lesser roller at the ends of the swing arms 298 is positioned beneath the paper tape 115 (FIG. 6) while the remaining lesser rolls on the swing arms 298, together with the fixed position roller 290, define a gentle curve for the paper tape leaving the laydown rollers when the swing arms 298 are in their lowered position (broken lines, FIG. 28), as when the tape is being run back and forth, with the tape head raised, for re-centering.

During normal laying, however, the swing arms 298 are raised, as shown by the position thereof in FIG. 7. When the arms 298 are raised, the paper tape is caused by the roller at the end of the arms 298 to make a sharp bend around the fixed position roller 290.

In the raised position of the arms, the leading end of a new tape course will be peeled from the paper tape by its inability to follow the paper tape around the fixed-position roller 290. The tape may then be retracted by operation of the tape drive until the leading end of the composite tape is beneath the laydown roller 60, and the tape head lowered to implant the leading end of the new course firmly upon the lay surface.

Mounted on the aft section 72 of the saddle frame in advance of the laydown rollers 60 is a pair of pinch rolls 308 and 310, the upper of which is journalled on a fixed axis in side bars 312 mounted on blocks 314 secured to the under edges of the side plates 78, and provided with a magnetic particle brake on an extension of the roller shaft. The lower roller 310 is segmented, being comprised of a series of ball bearings stacked upon a shaft 318 press fit into their inner races. The ends of the shaft 318 are fixed in mounting blocks each secured to the distal end of the piston rod of a short stroke, double-acting air cylinder 320.

The function served by this pinch roll assembly 308–310 in close proximity to the laydown rollers 60 enters into the tape steering method which can be executed by the tape head of the invention, the detail of which is explained later in this specification. For the moment it may be sufficient to note in normal tape laying on the natural path of the tape, these pinch rolls 308–310 remain inactive, i.e., the two-ply tape merely passes through the open nip of the pinch rolls.

On the other hand, when the tape head is operated in its tape-steering mode to lay tape in a curved path, as will be explained hereinafter, the paper tape 115 is threaded in a by-pass path over the top of the laydown roller subassembly, leaving the composite tape 114 to travel, unsupported by paper tape, down to the laydown rollers. In this laying mode, it is desirable to support the composite tape 114 in its travel to the laydown rollers, a function performed, in the immediate vicinity of the laydown rollers, by an endless belt 322 supported upon rollers mounted between the side plates 312 beneath the tape path through the pinch rolls 308–310, and beneath the segmented lower pinch roller 310.

C'-Axis Control

Control of the C'-axis, i.e., the lesser steering axis of the laydown roller subframe 80, is adaptive during normal natural path tape laying, being programmed in that mode only to the extent of re-referencing of the subframe at the conclusion of each tape course. Control of the C'-axis is fully programmed, in coordination with the C-axis, for completing the laying of tape in a curved course, yet to be explained.

Figure 31:
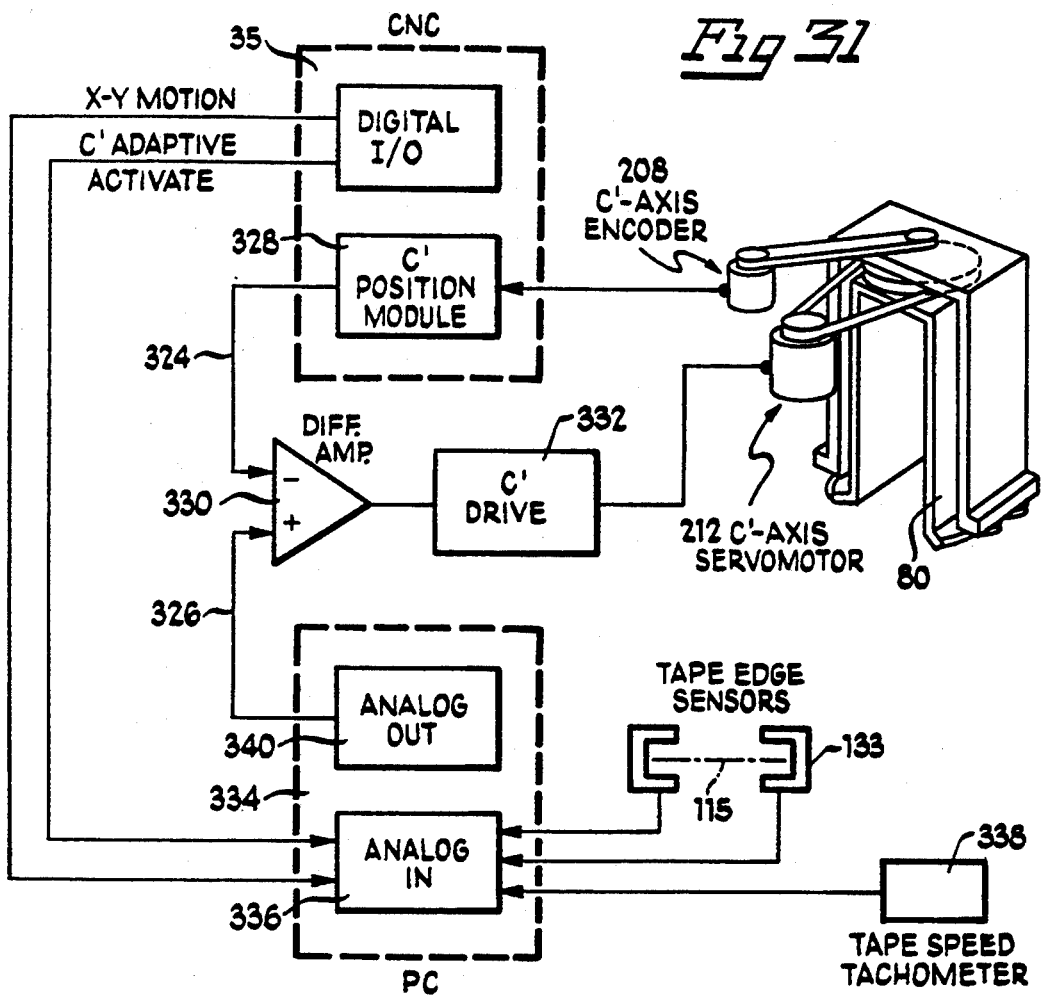
FIG. 31 is a diagrammatic view of the control circuitry, adaptive and feedback, for the motion of the laydown roller subassembly.

The control logic for that axis is illustrated diagrammatically in FIG. 31.

Control of the C'-axis is maintained by two control loops, a normal CNC-directed closed control loop 324, and an adaptive open control loop 326. The CNC-directed control loop performs the usual axis positioning functions, as well as conditioning the adaptive control loop for operation.

The CNC-directed loop includes a position module 328 in the CNC controller 35, which may be a GE-Fanuc CNC, a difference amplifier 330 which receives the signals of both loops, a drive or power amplifier 332, the C'-axis positioning motor 212, and the C'-axis encoder 208, which provides position feedback to the position module 328 of the CNC.

The adaptive control loop 326 includes a personal computer 334 having an analog input card 336 which receives signals from the paper tape edge sensors 133, and from a tape speed tachometer 338 whose input to the computer is integrated into a distance signal. The computer program monitors the distance signal, and, when called for by the tape edge sensor 133, sends a correction signal from an analog output card 340 to the difference amplifier 288 to call for a corrective repositioning of the laydown rollers 60 about the C'-axis by the C' servomotor.

Specifically, if the paper tape edge sensors 33 indicate that the paper tape 115 emerging from beneath the laydown rollers has drifted to the left (as viewed from behind the advancing tape head), the correction called for turns the laydown rollers as though to steer to the right, i.e., clockwise as viewed from above. A left-side drift of the paper tape results of course from a left-side drift of the composite tape beneath the laydown rollers. This change of orientation of the laydown rollers creates a differential tension across the width of the composite tape which, with cooperation from the A'-axis, re-centers the tape.

The program within the personal computer samples the signal from the paper tape sensor on the basis of a given increment of tape laid, e.g., in increments of one inch, and signals whatever steering correction is needed to re-center as each increment is laid. Within the laying speed capability of the tape head, e.g., 1750 inches per minute maximum, the period between adjustment signals is sufficiently great to avoid hunting.

The adaptive steering correction of the C'-axis is based upon a proportional, integral derivative calculation using constants stored in the computer's data file.

Sequential corrective action may continue, i.e., will remain possible as long as the CNC provides a C'-axis adaptive activation signal and a further signal indicative of movement of the tape head in the X-Y plane. When the X-Y signal alone is interrupted, whatever correction was last called for is maintained without further rotation in either direction. When the C'-axis adaptive activating signal is interrupted by the CNC, its C' position module 328 activates the servomotor 212 to return the C'-axis to its reference position, i.e., to return the laydown roller subframe 80 to a position in which the axis of the laydown roller is perpendicular to the A-axis.

The total swing of the subframe 80 on the C'-axis is limited to 15°, i.e., 7.5 degrees in either direction from the reference position. Motion beyond that range is prevented by limit switches which interrupt power to protect the various parts from collision damage.

Curved Course Tape Laying

While the principal activity of the CNC position module 328 during normal tape laying is to restore the C'-axis to its reference position when the C'-axis adpative control is deactivated, it exercises a more extensive function when laying tape in a course which is curved in the plane of the tape.

Although the fibers embedded in composite tape are essentially inextensible, and the tape 114 therefore normally non-steerable in departure from its natural path without puckering on the inside of any attempted turn, it has been discovered nevertheless that it is possible to lay such tape in a path curved in the plane of the tape by causing longitudinal slippage of the axially parallel fibers of such tape relative to one another by transversely differential accumulation of the composite tape alone, i.e., separated from its paper tape backing, in a standing bight formed around a segmented roll mounted for the forcible differential displacement of the roll segments, as disclosed in German Patent DE 40 02 087 C2 of Messerschmitt-Boelkow-Blohm GmbH, granted Nov. 14, 1991. Such tape turns are accommodated by rotation of the entire head about the C-axis coincident with its X-Y linear movement, but because of limitations in the method of the German patent which render that method ineffective to complete the turn with the entire course of the tape, the turn is completed in accordance with one aspect of this invention by a programmed simultaneous counterrotation of the C- and C'-axes.

The laying of the tape in a curved path upon the lay surface requires the anchoring of the tape to the lay surface and thereafter advancing the tape head along the curved path while feeding the tape to the laydown rollers 60 at a lineal rate which varies across the width of the tape from a minimum at the tape edge which lies along the inside of the curve to a maximum along the outside of the curve. The feed rate differential across the width of the tape must accordingly vary in accordance with the instantaneous radius of curvature of the tape increment beneath the laydown rollers as well as with the width of the tape.

The movement of the laydown rollers in the curved path is, of course, accomplished by conjoint programmed linear movement of the tape head in the X-Y plane, and programmed steering movement, initially of the entire tape head 20 on the C-axis, and subsequently of the laydown roller subframe 80 on the C'-axis as well.

Curved path layment is thus a dynamic process which requires steering rotation of the laydown rollers and the supply of the tape at a rate which varies across the width of the tape in coordination with the advancing movement of the tape head through its programmed turn.

The technique finds ready application in the layup of the skin shells of aircraft fuselages and comparable articles.

The Differential Tape Accumulator Mechanism

Inasmuch as the composite tape 114 must be separated from its paper backing tape in preparation for differential accumulation and curved path tape layment, provision is made in the tape head to separate the paper tape 115 from the composite tape 114 for bypass travel around the laydown rollers and C'-axis mechanism.

The bypass path and differential tape loop accumulator are indicated diagrammatically in FIG. 3, and shown in detail in FIGS. 18 to 30.

Poised above the tape path, immediately following the cutting station 128 and tape heater 130, is a nylon turning roller 400 which spans the tape head between the side plates 78 of the aft section 72. To prepare the tape head 20 for curved path laying, the paper backing tape 115 is separated from the composite tape 114 at the turning roller 400 and threaded about a series of shielded rollers 402–405 which guide the tape in a bypass path 115' up and over the steerable laydown roller subframe 80 and return it around an ultimate guide roller 406 to the normal path of the paper tape 115 from the laydown rollers 60 to the tape drive 82, whence it proceeds to the take-up reel 84.

The composite tape 114, after separation from the paper backing tape at the turning roller 400, enters and traverses the differential tape loop accumulator 408, initially following its normal path to the laydown rollers. However, when a curve in the tape path is to be made, a standing loop in the composite tape is created in the accumulator, and then progressively enlarged differentially across the width of the tape passing through the accumulator, so as to supply the composite tape to the laydown rollers at a rate which varies incrementally across the width of the tape as the laydown rollers turn into and follow a programmed curved path.

The standing loop referred to is formed by a pick-up roller 410 poised beneath the normal path of the composite tape through the accumulator. The pick-up roller is journalled at its ends in two arms 412 which flank the tape path, and are themselves pivoted in side mounting blocks 414 secured by screws to the side plates 78 of the aft section, being partially housed in downwardly open apertures 416 in those plates. The two pick-up roller arms 412 swing the pick-up roller in a circular path up and around a large, segmented shift roller 418, to develop the standing loop 420 in the tape. At the upper end of its travel, the pick-up roller presses the composite tape firmly against a fixed-axis anvil roller 422.

The latter is provided at one end with a magnetic particle brake 424 to provide on call a firm resistance to the free movement of the composite tape through the nip of the pick-up and anvil rollers 410 and 422 as the shift rollers are moved differentially into the standing loop 420 of composite tape to enlarge it on the edge of the tape making the inside of the turn while the opposite edge proceeds normally.

It will be understood that the laydown rollers 60 are first emplaced upon the tape to anchor it to the lay surface, that the standing loop 420 is developed in tape drawn from the supply by the pulling action of the pick-up roller 410, and that the differential accumulation occurs as the tape head 20 moves forwardly to lay the tape. The relative longitudinal shift of laterally adjacent tape increments occurs throughout the entire length of composite tape between the nip of the braked pinch roll 410 and 422 and the laydown rollers 60.

The pick-up roller arms 412 are keyed to short shafts 426 journalled at their ends respectively in bearings in the side mounting blocks 414 and in shift roller retainer blocks 428 secured atop a mounting bar 430 which spans and is secured to the two side mounting blocks 414. A spur gear 432, joined to the arm 412 by an elongated machine screw through an extended gear hub, is positioned for engagement by a drive rack 434 powered from above by an air cylinder (not shown). Alignment of the two pick-up roller arms 412 is maintained by a cross shaft 436 journalled in the side mounting blocks 414 and connected to the arms by timing belts 438 between pulleys on the outer ends of the cross shaft and arm shafts, respectively.

The action of the pick-up roll 410 and its supporting arms 412 wraps the composite tape around the segmented shift roller 418, drawing tape from the supply reel, as earlier noted. The segmented shift roller is fashioned much as were the laydown rollers of my prior U.S. Pat. No. 4,750,965, i.e., the roller collectively is an assembly of multiple identical segments 419 each comprising (FIG. 25) a circular central plate 444 having a diametral slot 442 and a concentric peripheral ring 444. The individual segments are aligned upon a shaft or bar 446 of rectangular cross section whose lesser dimension is accommodated slidably in the narrow dimension of the slot. The greater dimension of the bar cross section permits radial movement of all roll segments a distance somewhat greater than the width of the bar. The ends of the bar 446 are captured and secured in the shift roller retainer blocks 428.

The positions of the several segments 419 of the shift roll 418 are determined by the angularity of a back-up roll 448 which engages the shift roller segments 419 on their back sides, the front sides of the roller segments being normally urged toward the back-up roll 448 by the tension in the composite tape 114, which partially encircles them.

The back-up roll 448 is journalled in ball bearings seated in uprights 458 on a rock plate 460 seated on the mounting bar 430. The rock plate 460 has two pivots 462 each disposed so that its axis extended is tangent to the back-up roll 448 and to an end segment of the shift roll 418 in its central plane. See FIGS. 21 and 23. Each actual pivot 462 is a headed shoulder bolt received in an arcuate slot 464 in the rock plate 460 centered on the axis of the opposite pivot.

The rocking motion of the plate 460 is derived from a cross head 466 driven along a cross shaft 468 by threaded engagement with a fine pitch ball screw 470. An angle bracket 472 secured to the edge of the rock plate 460 presents a forwardly extending yoke 474 to a pin 476 on the cross head 466 so that rotation of the ball screw 470 shifts the cross head transversely of and beneath the tape path. This, in turn, turns the rock plate 460 and back-up roller 448 about one or the other pivot 462 to alter the angularity of the effective axis of the shift roller 418.

The ball screw 470 is driven from one end by a servomotor 478 and its rotation is monitored by a rotary encoder 480 at its opposite end for feedback to the control from which the relative displacement of the shift roller segments 419 is programmed. As earlier indicated, the increase in the size of the standing loop along the edge of the tape on the inside of the turn must continue, even without intensification of the curvature of the path, until either the tape is cut to terminate the course, or the curvature is diminished in intensity or reversed in direction.

It will be apparent therefore that the available space for the standing loop of the tape, or in the case of the specific mechanism disclosed, the maximum displacement of the segments of the shift roller, will determine the maximum degree of curvature and length of curve which can be laid. The illustrated apparatus was designed to lay three-inch wide composite tape in a six-meter long course with a radius of curvature of twenty meters.

From the foregoing description it will be apparent that the relative longitudinal shifting of the tape incrementally across its width by the differential accumulator requires the conjoint braking action of the anvil and pick-up rolls 410 and 422, through whose nip the tape passes before it encounters the shift roller 418, and the firm anchoring of the tape 114 to the lay surface beneath the laydown rollers 60 in order to permit the tape to be differentially stressed sufficiently to cause relative longitudinal shifting of adjacent tape increments. However, this ability of the shift roller 418 to accumulate tape terminates when the severed end of the tape passes through the pinching nip of the rollers 410 and 422, and, in the absence of further provision, the portion of tape remaining between the laydown rollers and the pinching rollers 410 and 422 will seek its natural path irrespective of the motion of the tape head.

Curved Course Laying Using C-Axis and C'-Axis Counterrotation

Figure 32:
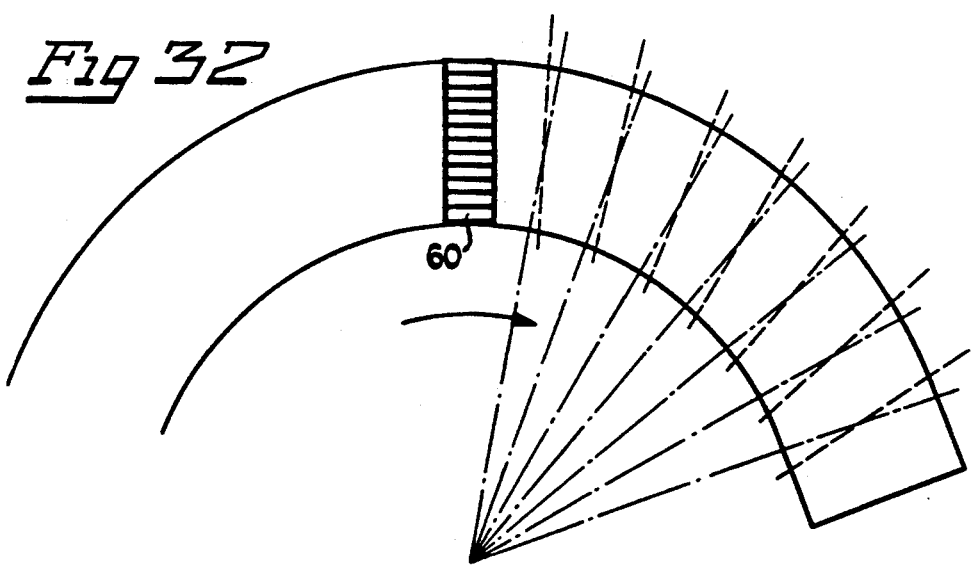
FIG. 32 is a diagram illustrating the completion of a curved tape layment by the combined use of the final pinch rolls and the reverse turning movement of the laydown roller subassembly, all at an exaggerated curvature to facilitate the explanation of the concept.

The further provision made in the tape head of this invention to continue the curved path layment after the tape has been released by the accumulator is the additional set of pinch rollers 308 and 310 acting in concert with a programmed progressive rotation of the laydown roller subframe 80 on the C'-axis in the direction opposite to the steering rotation of the entire tape head on the C-axis. This is shown to an exaggerated scale and degree in FIG. 32 in order to illustrate the concept by using a curve of constant radius divided into equal angular increments of the curved path of the tape head. From FIG. 32, it will be seen that as the tape head 20, in its entirety, is steered through the curved path by combined movement on the X, Y, and C axes, the segmented laydown rollers 60 are turned, by rotation of the laydown roller subframe 80 about the C'-axis, as though for making a turn in the opposite direction.

With the composite tape restrained in the nip of the lower set of pinch rollers 308 and 310, which are closed upon the composite tape 114 with the magnetic brake 316 energized, and with the tape edge on the inside of the turn anchored to the lay surface beneath the advancing end of the laydown rollers 60 as its opposite end recedes relatively, the continued turning movement of the tape head 20, and of lower pinch rollers 308-310 combined with the progressive turning of the laydown rollers in the opposite direction on the C'-axis, effects a relative longitudinal shift of laterally adjacent incremental strips of the composite tape between the laydown rollers 60 and the lower pinch rollers 308 and 310 that is reflected back through the remaining tail portion of the tape still to be laid in the curved path.

When the entire tail portion of the tape course has traversed the nip of the lower pinch rolls 308 and 310, the short portion of tape remaining is laid down as is.

The relative longitudinal shift of transverse increments of tape is preferably anticipated in the shape of the cut which severs the tape from the supply well in advance of complete layment. As that cut may bear little relation to the required shape of the tape end to begin the adjacent return course in the opposite direction, the paper tape drive is activated to position the leading end of the tape supply in the cutter to receive the correct beginning shape and to deliver the leading tape end through the accumulator, lower pinch rollers and tape shoe down to the lay surface to be overrun by the laydown rollers for the start of the new course.

It will be understood that in preparation for the advance of the new course of tape through the accumulator, the pick-up roller will be returned to its initial position beneath the tape path through the accumulator and only reactivated to reconstruct the standing loop in the tape after the leading end of the tape is anchored beneath the laydown rollers. As the layment proceeds, the differential accumulation of tape in the standing bight increases, but in the reverse order across the span of the shift rollers, as the side edge of the tape supply which was on the inside of the turn for the previous tape course will be on the outside of the turn for the return run.

CONCLUSION

It will be appreciated from the foregoing that the separate steerability of the laydown roller subassembly about the C'-axis increases the utility of the tape laying head in two important respects. Firstly, it provides a more responsive adaptive steering control than does the adaptive steering control of the entire tape laying head about the C-axis, this by virtue of its much reduced mass and by virtue of the perpendicularity of the C'-axis to the side hill slope when proceeding on a side hill course. Secondly, it introduces a new capability in tape laying, that of completing the layment of a curved tape course, in cooperation with a pair of pinch rolls, by counterrotation in opposition to steering rotation on the C-axis after the differential tape accumulator has lost its grip on the tape.

The features of the invention believed new and patentable are set forth in the accompanying claims.

What is claimed is:

1. In a multi-axis tape laying machine for depositing composite tape in courses upon a work surface to produce the plies of a laminated structure, wherein said tape laying machine includes a tape laying head movable linearly along at least two of three mutually perpendicular axes and rotatable about the third axis to align the tape in the direction of linear movement of the tape head relative to the other two axes, said linear movement and rotation with respect to each of said axes being accomplished by independent positioning motors under closed loop control from a common controller, the tape being carried by a supply reel mounted on said head and passing therefrom to a presser device which deposits the tape upon the work surface with contact pressure on the back of the tape as the tape laying head is moved along the work surface axially of the tape;

the improvement comprising:
the mounting of said presser device on said tape laying head for turning movement relative to said tape laying head independent of the aligning rotation of said tape laying head about said third axis;
a positioning motor for turning said presser device relative to said tape laying head;
a sensor for detecting sideward drift of the tape relative to the presser device; and
a power supply responsive to said sensor for operating said positioning motor to turn said presser device to restore its alignment with the oncoming tape as the tape laying head is moved along the work surface.

2. The apparatus of claim 1 wherein the tape en route from the supply to the presser device passes through the nip of a pair of pinch rolls adjacent to the presser device, at least one of said pinch rolls being retardable to tension the tape between the presser device and the pinch rolls while the tape is being laid, and at least the other of said pinch rolls being segmented into a plurality of narrow independently rotatable rollers on a common axis, and
a position feedback sensor is provided for the turning motion of said presser device and incorporated with said power supply in a closed control loop to said controller for independent rotational control of each of said tape laying head and said presser device.

3. The apparatus of claim 2 wherein the tape en route to the pinch rolls passes through a cutter which is activatable during layment of the tape to sever the tape from the supply, and thence to a differential accumulator which when activated tensions the tape en route to the presser device in a standing bight about a segmented roller having means for forcibly displacing the roller segments to increase the size of the bight differentially across the width of the tape to effect relative axial displacement of transversely adjacent increments of the tape between the accumulator and presser device until tension in the bight is lost by the entry of the cut end of the tape into the accumulator.

4. In a machine head for laying a tape of composite material on a work surface from a reel of such tape, said tape passing from said supply reel about a presser device which deposits the composite tape to the work surface by contact pressure as the machine head is moved along the work surface axially of the tape, said machine head being mounted for movement relative to said work surface along three mutually perpendicular linear axes and about two mutually perpendicular rotational axes one of which passes through said presser device parallel to one of said linear axes and the other is tangent to said presser device at the lateral center of its tape engaging surface and parallel to the axis of the tape engaged by the presser device, the improvement comprising
the mounting of said presser device on said machine head for independent turning movement relative to said machine head about a third rotational axis intersecting said mutually perpendicular rotational axes in a common point and swingable with said machine head about said tangent axis,
a positioning motor for turning said presser device about said third rotational axis,
a sensor for detecting lateral drift of the tape from a predetermined path beneath the presser device, and
a controller for operating said positioning motor to turn said presser device about said third rotational axis in response to lateral drift sensed by said sensor to turn said presser device to restore the oncoming tape to said predetermined path as the tape laying head is moved along the work surface.

5. The apparatus of claim 4 wherein the controller energizes the positioning motor in response to proportional, integral derivative processing of the output of the sensor.

6. The apparatus of claim 5 wherein a tachometer driven by the movement of the tape within the machine head provides a velocity signal to the controller and the controller integrates the velocity signal and samples and processes the output of the sensor after the layment of each predetermined length of tape.

7. The apparatus of claim 4 wherein the machine head is adapted to deposit the composite tape from a two-ply tape consisting of said composite tape laminated to a strippable backing tape, the composite tape is deposited upon the work surface by the pressure of said presser device upon the backing tape, the backing tape being separated from laid composite tape by a change of direction as it proceeds from beneath the presser device to a take-up reel on the machine head, and wherein said sensor detects the lateral drift of the backing tape emerging from beneath the presser device as a measure of the lateral drift of the composite tape from said predetermined path.

8. The apparatus of claim 7 wherein the presser device comprises a gang of individual centerless rollers each retained in one of an equal number of yokes having elongated shanks, the shanks of said yokes extending collectively upwardly through a perimeter frame which guides the shanks in axial movement relative to one another, upward motion being limited with the ganged rollers in concentric alignment,
said perimeter frame being secured in a fork frame mounted for swivel movement in said machine head,
individual spring means active between said swivel frame and each of said yokes to urge the yokes into said alignment,
individual air-operated cylinders extending said yokes against said springs to apply a net downward force upon said yokes when energized to cause each individual roller of the presser device to bear independently upon the tape being laid, and second control means to release selectively the air pressure energizing said cylinders, as required by the shape of the end of the course of composite tape being laid, said positioning motor being connected to turn the presser device by turning the swivel frame.

9. The apparatus of claim 7 having a take-up reel for the backing tape, said supply and take-up reels being driven in response to tape tension, a reversible tape drive engaging the backing tape and operable in conjunction with the two reels to drive the tape back to center the tape beneath the presser device and wherein the presser device comprises a gang of individual concentrically mounted pressure rollers bearing against the backing tape, the path of the two-ply composite tape to the pressure rollers is deflected by a formed shoe into a gentle arc of radius substantially greater than that of the pressure rollers which deposit the composite tape upon the work surface, a similar shoe of shape comparable to the first-mentioned shoe engages and deflects said backing tape in a similar gentle arc and wherein said similar shoe is attractable away from the path of the backing tape from beneath said pressure rollers in a direct line to said tape drive to release the backing tape from the laid composite tape, and extendable when the tape course is completed and the machine head is lifted from the work surface for the start of a new course, to prevent the separation of the leading end of the new tape course from the backing tape when the tape is run back and forth beneath the pressure rollers for re-centering.

10. The apparatus of claim 9 wherein the tape deflecting shoes are spaced along the tape path to and from the pressure rollers sufficiently to permit limited free turning movement of the pressure rollers about said third rotational axis.

* * * * *